(12) United States Patent
Meling et al.

(10) Patent No.: US 11,531,646 B2
(45) Date of Patent: Dec. 20, 2022

(54) FACILITATING GENERATION AND UTILIZATION OF GROUP FOLDERS

(71) Applicant: MICROSOFT TECHNOLOGY LICENSING, LLC, Redmond, WA (US)

(72) Inventors: Jon Meling, Tromsø (NO); Ashok Kuppusamy, Issaquah, WA (US); Berit Herstad, Oslo (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 226 days.

(21) Appl. No.: 16/916,535

(22) Filed: Jun. 30, 2020

(65) Prior Publication Data
US 2021/0406221 A1 Dec. 30, 2021

(51) Int. Cl.
*G06F 3/0482* (2013.01)
*G06F 16/16* (2019.01)
*G06F 16/14* (2019.01)
*G06F 3/04817* (2022.01)
*G06F 3/0486* (2013.01)

(52) U.S. Cl.
CPC .......... *G06F 16/168* (2019.01); *G06F 3/0482* (2013.01); *G06F 3/0486* (2013.01); *G06F 3/04817* (2013.01); *G06F 16/144* (2019.01)

(58) Field of Classification Search
CPC .. G06F 16/168; G06F 3/04817; G06F 3/0482; G06F 3/0486; G06F 16/144; G06F 16/00; G06Q 10/107
See application file for complete search history.

(56) References Cited

U.S. PATENT DOCUMENTS

| 2007/0061308 | A1* | 3/2007 | Hartwell | G06F 3/0484 |
| 2007/0226204 | A1 | 9/2007 | Feldman | |
| 2010/0064231 | A1 | 3/2010 | Gupta | |
| 2011/0289161 | A1 | 11/2011 | Rankin et al. | |
| 2013/0097526 | A1* | 4/2013 | Stovicek | G06Q 10/107 715/752 |
| 2015/0100644 | A1* | 4/2015 | Gulik | H04L 51/216 709/206 |

(Continued)

FOREIGN PATENT DOCUMENTS

WO 2016209849 A1 12/2016

OTHER PUBLICATIONS

"International Search Report and Written Opinion Issued in PCT Application No. PCT/US21/028735", dated Jul. 21, 2021, 12 Pages.

*Primary Examiner* — Hien L Duong
(74) *Attorney, Agent, or Firm* — Holzer Patel Drennan

(57) ABSTRACT

Methods, computer systems, computer-storage media, and graphical user interfaces are provided for facilitating generation and utilization of group folders, according to embodiments of the present technology. In embodiments, an indication to merge a first folder associated with a first entity with a second folder associated with a second entity is received. Based on the indication to merge, a group folder associated with the first entity and the second entity is generated. A representation of the group folder is provided for presentation via a navigation pane of the messaging application. A selection of the representation of the group folder can cause execution of a search query in association with an index of messages to obtain messages associated with the first entity and/or the second entity.

20 Claims, 20 Drawing Sheets

(56) References Cited

U.S. PATENT DOCUMENTS

| | | | |
|---|---|---|---|
| 2015/0363092 A1* | 12/2015 | Morton | G06F 3/0482 |
| | | | 715/752 |
| 2016/0320926 A1* | 11/2016 | Gan | G06F 3/04886 |
| 2018/0046334 A1* | 2/2018 | Nalliah | G06F 3/0482 |
| 2020/0120050 A1* | 4/2020 | Jung | H04L 51/216 |
| 2020/0195982 A1* | 6/2020 | Streater | H04N 21/26258 |
| 2021/0056254 A1* | 2/2021 | Kinoshita | G06V 30/418 |
| 2021/0132749 A1* | 5/2021 | Delanghe | G06F 16/953 |

* cited by examiner

FACILITATING GENERATION AND UTILIZATION OF GROUP FOLDERS

BACKGROUND

To more efficiently view messages (e.g., emails), users oftentimes organize or sort messages into folders. For example, a user may create a folder to easily view messages sent from a particular user. Creating a folder, however, generally includes an understanding of rules to effectively generate a folder that achieves a desired result of organizing messages into the folder. This can be a challenging and tedious task, particularly as the number of folders created and/or modified increases. Further, rules for folder creation may vary across different communication applications/systems and across devices (e.g., creating a rule via a desktop versus creating a rule via a mobile device) thereby resulting in even more complexity of folder generation.

SUMMARY

Various aspects of the technology described herein are generally directed to systems, methods, and computer storage media for, among other things, facilitating generation and utilization of group folders. In particular, folders associated with a group of individuals, or entities, can be efficiently generated and thereafter used to perform various functions in association with the group of entities. Group folders can be efficiently generated based on a simple user indication to create a group folder. In some examples, a user may indicate to create a group folder by selecting multiple entities, for example, by dragging and dropping folders associated with entities on to one another. Based on the user indication, a group folder can be automatically created, including a search query used to obtain or view messages associated with entities (e.g., individuals) of the group. The created group folder can then be used to enable a user to efficiently view and send messages in association with the group, among other things.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION

Figure 1:
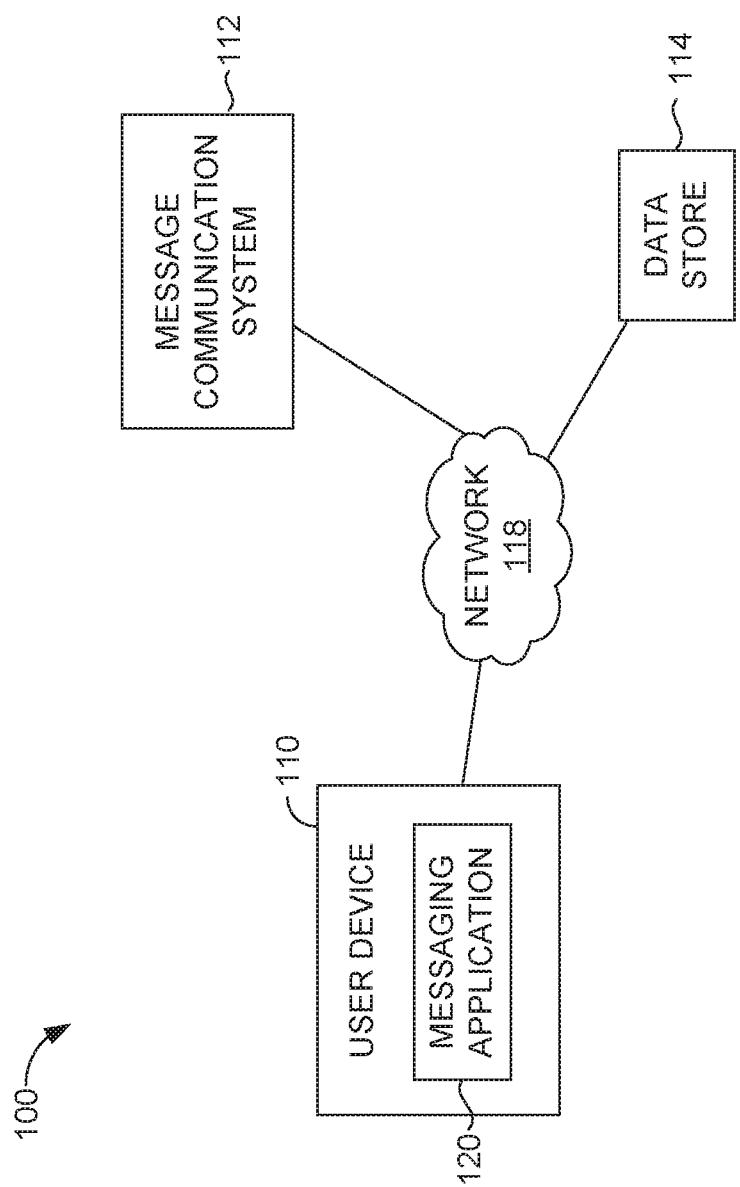
FIG. 1 is a block diagram of an exemplary system for facilitating generation and utilization of group folders, suitable for use in implementing aspects of the technology described herein.

The technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

Overview

Users spend a vast amount of time viewing, sorting, and organizing messages, such as email messages. To organize messages, a user may create folders for organizing emails into particular categories or topics. Conventionally, to generate a folder, a user selects to create a folder and provides or inputs a set of rules to be followed to sort a message into that folder. In some cases, a folder may correspond with an individual. In this regard, messages received from that individual may be organized in association with that folder. As such, to view messages sent from that particular individual, the user can select the folder and messages sent from the individual can be presented for viewing.

In some cases, multiple individuals may be associated with one another such that a user may desire to include messages associated with both individuals in a same folder. For examples, multiple individuals may be on a team with one another. As such, a user may wish to have messages from both individuals organized in a same folder. However, to create such a folder that organizes messages associated with multiple individuals, a user must manually create rules to effectuate such a folder. As such, generating a folder associated with multiple individuals can be difficult and tedious.

Accordingly, embodiments of the present technology are directed to facilitating generation and utilization of group folders. In particular, folders associated with a group of individuals, or entities, can be efficiently generated and thereafter used to perform various functions in association with the group of entities. Group folders can be efficiently generated based on a simple user indication to create a group folder. In some examples, a user may indicate to create a group folder by selecting multiple individuals, for example, by dragging and dropping folders associated with individuals on to one another. Based on the user indication, a group folder can be automatically created, including a search query used to obtain or view messages associated with individuals of the group.

The created group folder can then be used to enable a user to efficiently view and send messages in association with the group, among other things. In operation, in accordance with a user selecting a representation of a group folder via a graphical user interface, the search query can be used in association with an index of messages to identify messages that correspond with that group folder. The messages, or indications thereof, can be provided to the user device for presentation to the user. Accordingly, the user can efficiently view messages associated with the various entities of the group. For example, a user may view associated messages in one folder as opposed to switching between different folder views. Further, as representations of each folder take up valuable space on the graphical user interface (GUI), it may be helpful to reduce the amount of screen real estate occupied by folders. As such, aggregating messages associated with multiple entities can reduce folder occupancy and thereby improve navigation within a messaging system.

Further, the user may select to compose a message in association with the group folder to efficiently compose a message to send to the various entities (e.g., individuals) of the group. To this end, a template message can be generated that includes each of the individuals or entities of the group populated as recipients of the message. As such, the user does not need to manually or specifically input each desired entity as a recipient. Moreover, an alias representing the group does not need to be created and/or used. Advantageously, this reduces time spent by the user generating a message and also reduces potential errors (e.g., unintentionally omitting a recipient).

In addition to the efficiencies gained via generation and use of group folders, as described herein, in embodiments, the group folders are specific to a user. In this regard, such group folders are private to the user (e.g., not a public folder). For instance, other individuals, for example in the group, are not able to see and/or use such a private group folder. As individual and/or entity names are independently specified in a message composed (e.g., a group alias is not referenced as a recipient), the group remains private to the user even when messages are communicated in association with a group.

Further, such groups can be generated or adjusted ad hoc by the user based on user preferences. Ad hoc generation and/or adjustment of group folders is particularly helpful when individuals of a group change, priorities of groups change, and the like. Advantageously, reducing the amount of time spent organizing, viewing, searching, and/or composing messages can reduce utilization of computing resources.

Overview of Exemplary Environments for
Facilitating Generation and Utilization of Group
Folders Referring initially to FIG. 1, a block diagram of an exemplary network environment 100 suitable for use in implementing embodiments of the invention is shown. Generally, the system 100 illustrates an environment suitable for facilitating generation and utilization of group folders. The network environment 100 includes a user device 110, a message communication system 112, and a data store 114. The user device 110, the message communication system 112, and the data store 114 can communicate through a network 118, which may include any number of networks such as, for example, a local area network (LAN), a wide area network (WAN), the Internet, a cellular network, a peer-to-peer (P2P) network, a mobile network, or a combination of networks. The network environment 100 shown in FIG. 1 is an example of one suitable network environment and is not intended to suggest any limitation as to the scope of use or functionality of embodiments of the inventions disclosed throughout this document. Neither should the exemplary network environment 100 be interpreted as having any dependency or requirement related to any single component or combination of components illustrated therein. For example, the user device 110 may be in communication with the message communication system 112 via a mobile network or the Internet, and the message communication system 112 may be in communication with data store 114 via a local area network. Further, although the environment 100 is illustrated with a network, one or more of the components may directly communicate with one another, for example, via HDMI (high-definition multimedia interface), and DVI (digital visual interface). Alternatively, one or more components may be integrated with one another. For example, at least a portion of the message communication system 112 and/or data store 114 may be integrated with the user device 110. For instance, a portion of the message communication system 112 configured to generate group folders may be performed via a user device, while utilizing group folders may be performed via a server in communication with a user device.

The user device 110 can be any kind of computing device capable of facilitating generation and/or utilization of group folders. For example, in an embodiment, the user device 110 can be a computing device such as computing device 700, as described above with reference to FIG. 7. In embodiments, the user device 110 can be a personal computer (PC), a laptop computer, a workstation, a mobile computing device, a PDA, a cell phone, or the like.

The user device can include one or more processors, and one or more computer-readable media. The computer-readable media may include computer-readable instructions executable by the one or more processors. The instructions may be embodied by one or more applications, such as messaging application 120 shown in FIG. 1. The application(s) may generally be any application capable of facilitating message communication. In this regard, the messaging application 120 may be able to facilitate composition of messages, sending of messages, receiving of messages, and/or displaying messages. Messages may be in any number of forms including, for example, emails, instant messages, text messages, or the like. As such, messaging application 120 may facilitate communication of email, instant messages, and/or text messages. Messaging application may include a collaboration application, for example, that includes some form of messaging (e.g., email, instant messages). One example of a collaboration application is Microsoft® Teams®. In some implementations, the application(s) comprises a web application, which can run in a web browser, and could be hosted at least partially server-side. In addition, or instead, the application(s) can comprise a dedicated application. In some cases, the application is integrated into the operating system (e.g., as a service).

In embodiments, content may be presented via messaging application 120 operating on the user device 110. In this regard, the user device 110, via messaging application 120, might be used to present content. Content may refer to any type of electronic content, messages, folders, tools, or the like. As described, a messaging application may be a stand-alone application, a mobile application, a web application, or the like. In some cases, the functionality described herein may be integrated directly with an application or may be an add-on, or plug-in, to an application.

Messaging application 120 may enable generation of group folders. As described herein, a group folder refers to a folder, or other association, collection, or set, defined or designated in association with a group of entities, individuals, or members (an individual or entity associated with a group). In this way, a group folder may represent any association of entities, including a physical association or logical association. An entity may include an individual or other representation used by an individual, organization, or the like. An entity may correspond with an address or unique identifier, such as an email address, phone number, alias, or the like. Entity, member, and individual may be used interchangeably within this description.

In embodiments, a group folder corresponds with messages (e.g., emails) associated with one or more entities of the group. In this regard, messages received from any of the entities in the group can be accessed via the group folder. Group folders can be generated in any of a number of ways, some of which are described herein. In accordance with generating a group folder, the messaging application 120 may access and/or manage messages associated with the group folder. For instance, the messaging application 120 may be used to view messages, compose messages, or otherwise manage messages or the group associated therewith.

User device 110 can be a client device on a client-side of operating environment 100, while message communication system 112 can be on a server-side of operating environment 100. Message communication system 112 may comprise server-side software designed to work in conjunction with client-side software on user device 110 so as to implement any combination of the features and functionalities discussed in the present disclosure. An example of such client-side software is application 120 on user device 110. This division of operating environment 100 is provided to illustrate one example of a suitable environment, and it is noted there is no requirement for each implementation that any combination of message communication system 112 and user device 110 to remain as separate entities.

In an embodiment, the user device 110 is separate and distinct from the communication system 112 and the data store 114 illustrated in FIG. 1. In another embodiment, the user device 110 is integrated with one or more illustrated components. For instance, the user device 110 may incorporate functionality described in relation to the message communication system 112. By way of example only, a messaging application may operate with functionality being performed only at the user device. For clarity of explanation, embodiments will be described in which the user device 110, the communication system engine 112, and the data store 114 are separate, while understanding that this may not be the case in various configurations contemplated within the present invention.

The user device 110 communicates with the communication system engine 112 to facilitate generation and/or utilization of group folders. In embodiments, for example, a user utilizes the user device 110 to facilitate generation and/or utilization of group folders, via the network 118. For instance, in some embodiments, the network 118 might be the Internet, and the user device 110 interacts with the message communication system 112 to facilitate such generation and/or use of group folders. In other embodiments, for example, the network 118 might be an enterprise network associated with an organization. It should be apparent to those having skill in the relevant arts that any number of other implementation scenarios may be possible as well.

The message communication system 112 is generally configured to facilitate group folder generation and/or utilization. In particular, an indication to create or generate a group folder can be obtained by the message communication system 112. For example, a user can interact with the messaging application 120 of user device 110 to specify a desire to generate a group folder. In accordance with obtaining an indication to create a group folder, the message communication system 112 can create the group folder in association with one or more entities (e.g., individuals) specified by the user. In one implementation, a query can be generated for use in searching for messages received from entities in the group. A query may include, for instance, entity identifiers identifying each entity, member, or individual of the group. In addition to generating a query for the group folder, the message communication system 112 can generate or provide a default group folder representation for visually representing the group folder. As described, advantageously, by presenting a single folder to represent multiple entities (e.g., within a favorites listing), the navigation pane of a messaging user interface is less congested and easier to navigate.

Upon generation of a group folder, the messaging communication system 112 can facilitate use of the group folder. For example, upon selecting to view messages associated with the group, the messaging communication system 112 can utilize the query to search for and obtain relevant messages (e.g., messages received from any of the individuals of the group). As another example, in accordance with a selection to generate or compose an email in association with the group, the messaging communication system 112 can initiate a template message (e.g., within a message window or pane) including each of the group members as a recipient of the message. Advantageously, each group member can be listed individually as recipients, as opposed to using an alias for the group, such that an alias need not be created and the formed group remains private to the user.

The data store 114 may include any type of data that might be generated from or used or accessed by the user device and/or the message composition engine. As an example, the data store may include, messages, metadata, queries, and index(es). Although illustrated as a single data store, as can be appreciated, data store 114 can represent any number of data stores. Further, although shown as separate from the user device and the message composition engine, such a data store, or portion thereof, can be integrated with the user device and/or message composition engine.

Figure 2:
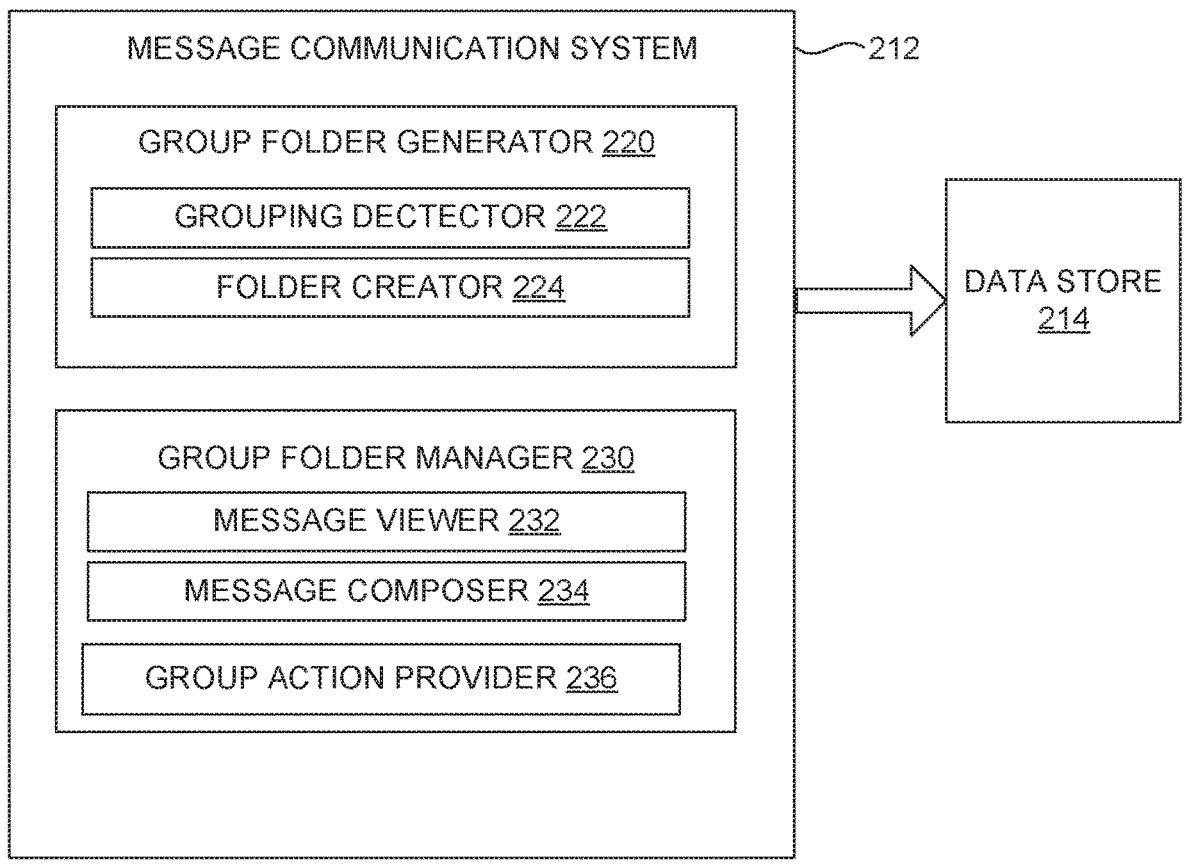
FIG. 2 is an example message communication system in accordance with aspects of the technology described herein.

Turning now to FIG. 2, FIG. 2 illustrates a message communication system 212. In embodiments, the message communication system 212 includes a group folder generator 220 and a group folder manager 230. According to embodiments described herein, the message communication system 212 can include any number of other components not illustrated. In some embodiments, one or more of the illustrated components 220 and/or 230 can be integrated into a single component or can be divided into a number of different components. Components 220 and/or 230 can be implemented on any number of machines and can be integrated, as desired, with any number of other functionalities or services. By way of example only, group folder manager 230 may operate at a server, while group folder generator 220, or aspects thereof, may operate at a user device.

The message communication system 212 can communicate with the data store 214. The data store 214 is configured to store various types of information used by the message communication system 212. In embodiments, the message communication system 212 provides data to the data store 214 for storage, which may be retrieved or referenced by the message communication system 212. Examples of types of information stored in data store 214 may include, for example, messages, metadata, queries, and index(es).

The group folder generator 220 is generally configured to generate group folders. As described herein, a group folder refers to a folder, or association, defined or designated for a group of entities, individuals, or members. Generally, a group folder corresponds with messages (e.g., emails) associated with one or more entities of a group. In this regard, in embodiments, messages received from any of the entities in the group can be accessed via the group folder. The group folder generator 220 may include a grouping detector 222 and folder creator 224.

The grouping detector 222 is generally configured to detect indications to generate or create a group folder. An indication to generate or create a group folder is generally initiated or provided by a user via a graphical user interface. In this way, a user may interact with a graphical user interface via a message application (e.g., messaging application 120 of FIG. 1) to explicitly or implicitly indicate or initiate a desire to create a group folder. As can be appreciated, an interaction or selection provided by a user can be input, for example, via a touch input, a selector input, an air gesture input, a voice command, or the like.

In some cases, a user may specify whether a group folder is desired as a favorites folder. A favorites folder generally refers to a folder included in a favorites listing or portion of a navigation pane. A navigation pane is used to navigate from one location to another. As such, a navigation pane may include various folders for accessing different sets of messages. A favorites listing or portion within a navigation pane is typically presented at the top of the navigation pane such that a user can more efficiently access items in their favorites listing. Although many embodiments described herein include the group folders being created in a favorites listing, embodiments are not limited herein and can be created in various other locations within a navigation pane.

In association with indicating a desire to create a group folder, the grouping detector 222 may also detect entities corresponding with a group folder to be created. For example, the grouping detector 222 may detect a set of entities a user specifies to associate with the group folder. Any number of entities (e.g., individuals) may be designated for a group folder.

Interactions or input provided by a user to indicate a desire to create a group folder and/or designate entities for the group can be provided in any of a number of ways. Examples of providing such interactions (e.g., to initiate group folder creation and/or specify individuals of the group) include folder merging, inferred group selecting, individual selecting, search selecting, and message selecting techniques. Examples of such techniques are provided herein, but are not intended to limit the scope of embodiments.

Folder merging refers to merging folders to initiate creation of a group folder. In this way, a user may select to merge at least two existing folders to create a group folder combining or aggregating entities associated with the existing folders. A folder selected for merging may correspond to an entity or a set of entities. For example, a first folder associated with a first individual may be merged with a second folder associated with a second individual to indicate a desire to generate a group folder corresponding with the first and second individuals. As another example, a first folder associated with a first individual may be merged with a second folder associated with a second individual and third individual (e.g., via a previous group folder operation) to indicate a desire to generate a group folder corresponding with the first, second, and third individuals.

An indication to merge folders may be provided in any of a number of ways, including use of a merge gesture. A merge gesture generally refers to a gesture provided that indicates merging folders. In one example, a user may drag and drop, or otherwise move, one folder into a region of another folder. For example, a user may drag and drop a first previously created folder to overlay a second previously created folder to initiate merging of the first and second folder into a group folder. In some implementations, as one folder is within a region on a graphical user interface of another folder (e.g., overlaying another folder), a visual notification may be presented to notify the user a group folder is being, or is to be, created. For example, a text notification or icon notification may be presented to indicate the forming of a group folder. As another example, a user may utilize a user interface to select multiple folders to merge.

In some implementations, folders selected for merging may be existing folders in a favorites list. In this regard, the group folder may also be created in a favorites list. Advantageously, including a group folder in a favorites list enables a user to easily and quickly access the group folder and messages associated therewith. Further, as discussed, aggregating individual folders into a group folder reduces the number of items, or folders, in a favorites list in the navigation pane.

Inferred group selecting refers to selecting an inferred group to initiate a group folder. An inferred group generally refers to a group of entities inferred to be related to one another in some manner and presented to a user as an inferred group. An inferred group may be identified based on any number of criteria, such as, for example, individuals associated with a particular organization, individuals having a shared surname, individuals commonly included in same messages, or the like. By way of example only, upon detecting a threshold number of messages with a same set of individuals as recipients, the set of individuals may be identified as an inferred group and presented as such to a user. A user may then select to create a group folder that includes each of the individuals in the inferred group. For example, upon being presented with an inferred group, a user may select a "star" icon to favorite the inferred group such that a group folder corresponding with each individual of the inferred group is created as a favorites folder. As another example, upon recognizing an inferred group, a voice option may be presented to request whether to create a group folder. For instance, a voice option may ask "would you like to create a group including person A, person B, and person C?"

Entity selecting refers to selecting entities (e.g., individuals) to be included in a folder group. Entities may be selected via a graphical user interface in a number of ways. As one example, individuals may be selected via a contact list or a drop down list. In this regard, a user may select particular individuals included in a contact list or a drop down list to form a group folder. Entities may also be selected via a voice command. For instance, a voice prompt may ask whether to "create a group including person A, person B, and person C," and a user may respond to confirm or deny whether to create the group.

Search selecting refers to selecting entities associated with a search for inclusion in a group folder. In this regard, a group folder can be formed based on performance of a search for multiple entities. For example, assume a user inputs multiple users into a search bar to view messages associated with those users. In such a case, a user may select to create a group folder that includes such entities included in the scope of the search. For instance, in association with a search including a set of individuals, a user may select a "star" icon to create a group folder in a favorites listing of the navigation pane.

Message selecting refer to selecting entities associated with a message (e.g., an email) to form a group folder. In this way, a user may select to create a group folder corresponding with recipients/sender of a message (e.g., message being composed, message received). For instance, upon adding multiple individuals as recipients to a message, a user may select to create a group folder that includes such individuals. By way of example only, a user may select a "star" icon (e.g., presented within a message window) to create a group folder in a favorites list of the navigation pane. As another example, a user may select to create a group folder that includes individuals or entities included in a received message.

Utilizing such techniques to initiate group folder creation enables a user to efficiently and flexibly organize the navigation pane in accordance with the user's preferences. As can be appreciated, indicating a desire to generate a group folder and/or entities corresponding therewith can be provided in any of a number of ways, only some of which are provided as examples herein. Further, various techniques can be sequentially used such that one technique may be used to initially generate a group folder and another technique may be used to modify the group folder. For example, an initial group folder associated with a particular set of individuals may be initiated based on an inferred group. Thereafter, a user may select to add another individual to the folder group via a user selection or merging of folders.

The folder creator 224 is generally configured to create group folders. In particular, the folder creator 224 may create a group folder that corresponds with multiple entities. A folder may generally refer to a container or set of documents or items (e.g., messages). As such, a group folder includes documents or items (e.g., messages) related to or associated with the group, or entities thereof.

In embodiments, the folder may be a virtual folder (also referred to as a search folder). A virtual folder generally stores a search query. In this regard, the virtual folder may include a file that stores a search query, or an indication thereof. The search query or criteria can be used to obtain messages that match the criteria, which are dynamically aggregated into the virtual folder. Such messages corresponding with a virtual folder can reside in any of a number of locations. In this way, the messages are not limited to any particular location, such as a single physical location on a hard drive. Advantageously, searching for messages can be performed more efficiently by pre-indexing locations associated with a search. As such, when a search for messages is performed, an index is accessed and used to perform efficient searching (e.g., as an entire folder hierarchy is not accessed). The index may represent the entire set of messages suitable for searching. In some cases, subindexes or subportions of an index can be created in association with a group. In this regard, searching for relevant messages can be performed in an even more efficient manner. In some embodiments, a virtual folder may include an index of messages associated with a query.

To create a group folder, the folder creator 224 can identify and associate the group of entities that correspond with the group folder. In embodiments, the folder creator 224 can recognize and associate the entities specified by a user. The entities can be associated in a number of ways. In some implementations, the entities identified to correspond with a group folder can be stored together as a contact list. In operation, upon recognizing a set of entities for inclusion in a group folder, a contact list may be created and stored (e.g., entries added to an existing contact list or creation of a new contact list for the group). A contact list may include various information associated with entities or individuals of the group including names, email addresses, phone numbers, other contact information, demographics, or the like. Such associations (e.g., via a contact list) can be stored in a data store, such as data store 214. In some embodiments, a new dedicated contact list of entities may be created in a contact list.

Further, to generate a virtual group folder, the folder creator 224 can generate a search query in association with the folder based on the entities, members, or individuals of the group. In this regard, based on an indication to generate a group folder, the folder creator 224 can use member identifiers to automatically create a query corresponding with the virtual folder. As described, the query can be stored (e.g., in a file at data store 214) and subsequently accessed to present messages corresponding with the entities of the group.

As one example, to generate a query, an identification of each of the entities of the group may be included as part of the query used to identify messages relevant or related to the group. As can be appreciated, in some cases, the query may be structured in an "or" format such that any message in which any member is a sender and/or recipient is identified. In other cases, the query may be structured in an "and" format such that any message in which each member is presented as a sender and/or recipient is identified. A user may be identified or designated in a query in any number of ways, such as via a name, an alias, or other unique identifier. A query may include other parameters to facilitate the search for relevant messages. By way of example only, a query may include a group attribute (an attribute identifying a group), an alias, an indication of whether the user is to be a sender and/or recipient, a time duration or time span, and/or the like. Such parameters may additionally or alternatively be applied as a filter (e.g., to filter previously received/indexed messages to include only those corresponding to identified parameters, such as member identifiers).

As described above, in some embodiments, a portion of an index, or subindex, may be created to more efficiently perform searches (e.g., using the query). In such implementations, the folder creator 224 may facilitate creation of the subindex related to messages associated with each of the members of the group. For example, a subindex corresponding with messages related to group members may be created such that an efficient search can be performed to obtain and present the messages. A subindex may be created in association with each group folder. Such subindexes may be included as portions of an index of messages associated with a user account. As such, in some embodiments, creation of a group folder results in modification of an index, creation of a subindex, and/or the like.

The folder creator 224 can also facilitate generation and/or presentation of a folder representation. A folder representation is used to visually represent a group folder via a graphical user interface. A folder representation may be any icon, text, or form of representation of a group folder. In some cases, a folder representation may be initially presented as a general default folder representation used to represent any group folder. In such cases, a user may modify the folder representation to specify members of the group. For example, a user may modify the folder representation to indicate the specific group members by name. As another example, a user may modify the folder representation to indicate a category or generalization of the members that make up the group.

In other implementations, a folder representation may be generated that is specific to the group folder. For instance, the folder representation may be generated to specify group members associated with the group folder. As one example, in cases that two individuals are members of a group, the group folder representation generated may include the names of the two individuals (e.g., first names, last names, or both first and last names). In cases that three individuals are members of a group, a portion of the names may be selected for the group folder representation with an additional member indicator indicating additional members are part of the group. The additional member indicator may be a symbol or a numeral indicating a particular number of additional members.

Irrespective of whether the folder representation initially generated to represent a group folder is a generic or specific representation, a user may modify the folder representation. For example, a user may rename the folder representation using text (e.g., "my team," "book club," "my managers"). Alternatively or additionally, an icon may be used to represent the group folder (e.g., an image).

In addition to generating and/or providing a folder representation for a group folder, the folder creator 224 may identify and/or provide other attributes associated with the group folder. For example, the number of individuals included in a group may be captured and/or presented.

Upon generating a group folder, a group folder can be accessed and used. In this regard, the group folder manager 230 can operate to manage various functionalities of group folder utilization. In embodiments, the group folder manager 230 can include a message viewer 232, a message composer 234, and a group action provider 236.

A message viewer 232 is generally configured to enable viewing of messages associated with a group folder. A message may be identified as associated with a group folder when a message satisfies criteria of the query corresponding with the group folder. For example, messages sent by a member of the group may be identified as associated with the group folder based on a query that includes group member identification.

In embodiments, upon a user selecting a group folder, the message viewer 232 can facilitate obtaining and/or presenting a set of messages associated with the group folder. In this regard, a search query associated with the selected group folder may be accessed (e.g., via data store 214) and used to obtain or retrieve the set of messages associated with the group folder. In particular, the search query may be used to query an index (e.g., stored in data store 214), or a portion thereof, to identify a set of messages related to the group. As described, the search query may include member identifiers and/or other attributes to identify relevant messages. The index, or subportion of the index related to the group folder, can be accessed to identify particular messages associated with the group folder. Using pointers to the messages, the messages can be looked up in storage (e.g., a data store), fetched, and provided to a user device for display to a user. As can be appreciated, in many cases, a representation of a message may be displayed or presented and, upon, selection of the message representation, the message content can then be presented.

In some cases, the message viewer 232 may initially search for and obtain a portion of the messages and continue to search for and obtains portions in chunks or portions until each message that satisfies the query is obtained. For example, to increase efficiency, in some cases, the message viewer 232 may initially obtain a set of most recent messages (e.g., the most recent 50 messages). Performing operations in a sequential manner can enable a more efficient presentation of relevant messages.

A message composer 234 is generally configured to enable message composing in association with a group. In particular, a user may provide an indication of a desire to compose a new message. For instance, a user may select a "new email" icon to generate or compose a new message. As another example, a user may right click on the group folder representation to view a menu and select a "new email" via the menu. As yet another example, a user may provide a voice command to "send an email to [group]." In accordance with selecting to generate or compose a message in association with a group folder, a new email may be presented (via message window or message pane).

In embodiments, as the email is initiated in accordance with a group folder, the recipient or "to" field can be automatically populated with the members of the group. For example, assume a group includes member A and member B. In such a case, the recipients included in the recipient field can include member A and member B (e.g., via email addresses or other member identifiers, for example, looked up from a contact list or otherwise associated with the group folder). Advantageously, a user composing the message does not need to input or select the specific recipients individually, which becomes even more efficient when the groups include numerous entities.

In accordance with some embodiments described herein, the members associated with the group folder are individually included as recipients. In such an embodiment, a group alias is not used to identify a distribution list for the members. Advantageously, the message is formed with individual recipients listed separately such that the formed group is private to the user sending the message. That is, a recipient of the message does not view any association of the recipients based on use of a common alias or distribution list. The user, however, can efficiently compose the message without having to selectively and independently add each entity (e.g., individual).

A group action provider 236 is generally configured to manage a group folder by providing actions that may be taken in association with a group folder. In some embodiments, a menu of action items may be presented in association with a group folder. The menu of action items may be presented in any of a number of ways. As one example, a user may select a group folder (e.g., via a right click), and based on such a selection, a menu of action items may be presented.

By way of example only, action items may include a split action, a delete action, a group transfers action, and a card creation action. A split action refers to a split of a group folder to folders associated with entities. For example, assume a group folder corresponds with individual A and individual B. In such a case, upon receiving a selection to perform a split, the group folder is replaced with a first folder associated with individual A and a second folder associated with individual B. In some cases, a split may be determined based on a folder merging. In effect, a split action would undo a folder merging such that the original folders merged to generate the group folder would result. For instance, if folder A and folder B are merged to form a group folder. In accordance with request a folder split, folder A and folder B would be reformed, for example, in a favorites listing of a navigation pane. A delete action removes the group folder from the navigation panel. In cases that group folders are split or deleted, the index can be updated or modified to reflect the change in group folders. For example, subindexes can be reformatted or deleted to adapt to changes in the group folder.

A group transfer action refers to an action that transfers the group to another implementation, such as a group formed via another messaging application or platform. For example, assume that a group folder is generated in association with an email messaging application. Now assume a user selects to perform a group transfer action. In such a case, the associated group members can be used to form a group via an instant messaging application. As such, the same entities already designated to form a group folder can be applied and used in another communication platform. As such, the transferred group may be viewed in other messaging platforms.

A card creation action generally refers to creation of a card or other data representation associated with the group, and/or entities thereof. A card generally refers to a set of information association with a group and/or entities of the group. A card may include various aspects of information directed to entities of the group. For example, a card may include recent emails, upcoming meetings, calendar information, or other information about a group. In some embodiments, a user may select to view a card, for example, via a menu of action items. In such a case, relevant data or attributes can be obtained and provided for display. For instance, data associated with each of the individuals can be obtained using user profiles, message index(es), calendar index(es), or the like.

Figure 3A:
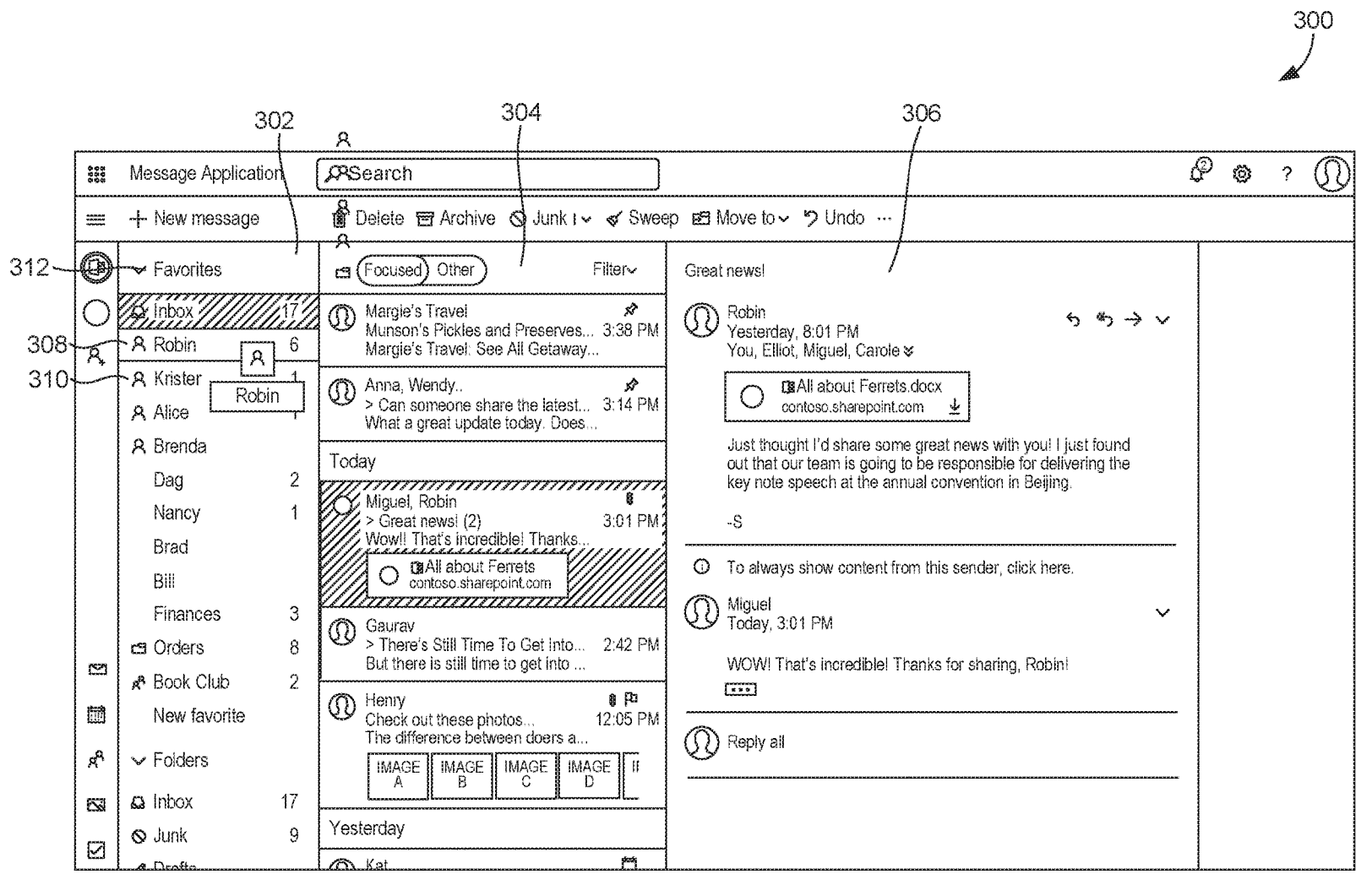
Figure 3B:
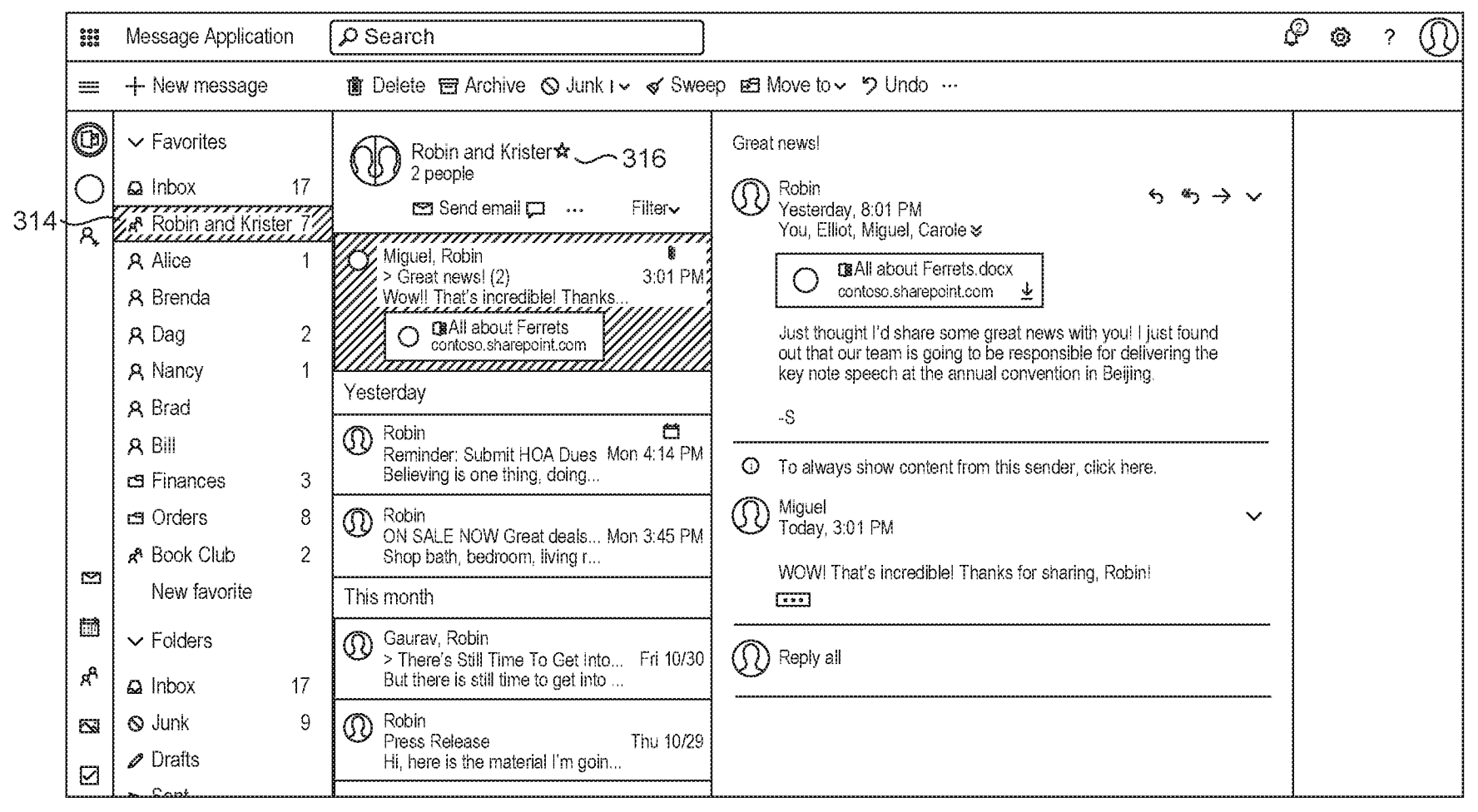

Exemplary Implementations for Facilitating
Generation and Utilization of Group Folders As described, various implementations can be used in accordance with embodiments of the present invention. FIGS. 3A-3N illustrate various graphical user interfaces that may be employed in accordance with embodiments described herein. Such graphical user interfaces may be presented via a user device. The graphical user interfaces presented in FIGS. 3A-3N are intended to be exemplary in nature and not limiting.

Turning initially to FIG. 3A, FIG. 3A includes a graphical user interface 300 associated with a messaging application, such as an email messaging application. As illustrated, the graphical user interface 300 includes a navigation pane 302, a message pane 304, and a reading pane 306. The navigation pane 302 generally includes a list of folders used to navigate messages. The message pane 304 includes a list of messages corresponding with a folder selected in the navigation pane 302. Reading pane 306 includes a view of the message such that a user can read the content of the message.

As shown in FIG. 3A, a user has a variety of folders associated with individuals, such as Robin folder representation 308 and Krister folder representation 310. Folder representation 308 and 310 are positioned in the favorites listing 312. The Robin folder representation 308 corresponds with messages from Robin, and the Krister folder representation 310 corresponds with message from Krister. Assume that a user desires to aggregate the Robin folder and Krister folder. For instance, Robin and Krister may be the user's managers, and the user desires to group messages from Robin and Krister together to reduce navigation efforts and/or reduce utilization of screen real estate. In such a case, in accordance with embodiments described herein, the user may select the Robin folder representation 308 and drag the folder representation to overlay the Krister folder representation 310. In doing so, the user is providing an indication to merge folders 308 and 310 into a group folder that corresponds with Robin and Krister. As shown in FIG. 3B, Robin and Krister group folder representation 314 is created. As described herein the group folder representation 314 can be automatically named "Robin and Krister" based on the individuals of the group. As further illustrated in FIG. 3B, when the Robin and Krister group folder representation 314 is selected, the message pane 316 now includes messages corresponding with (e.g., received from) Robin and/or Krister.

Figure 3C:
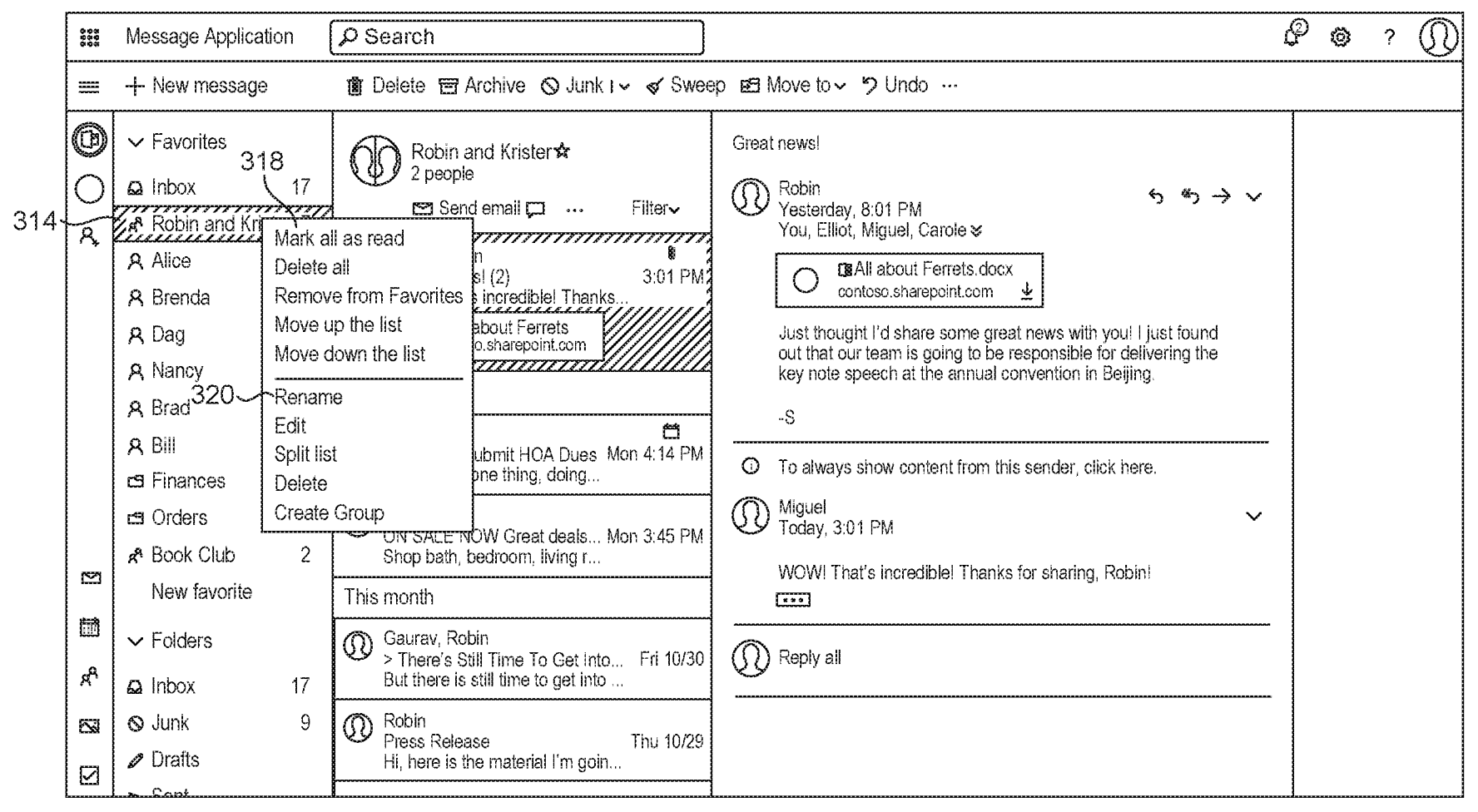
Figure 3D:
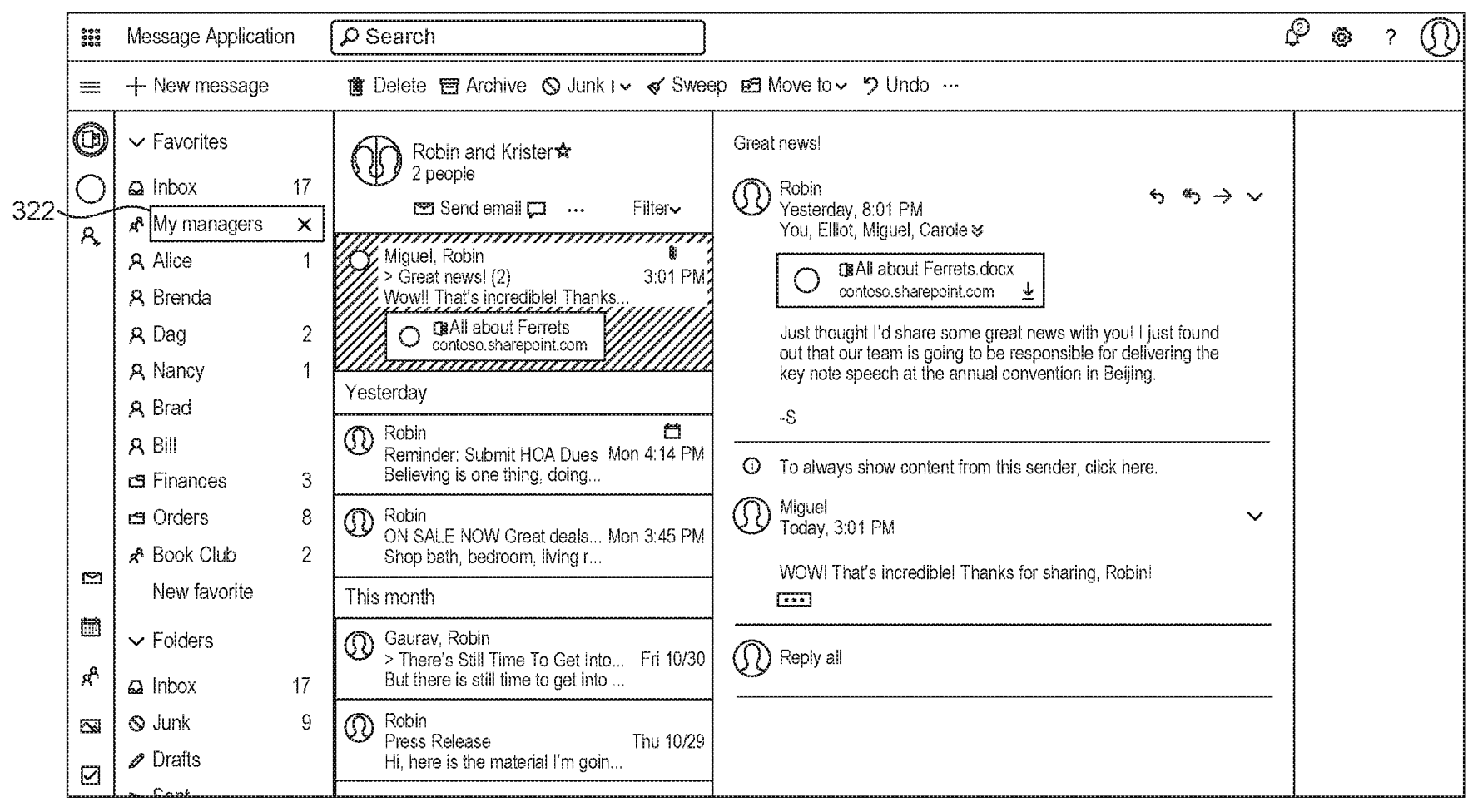
Figure 3E:
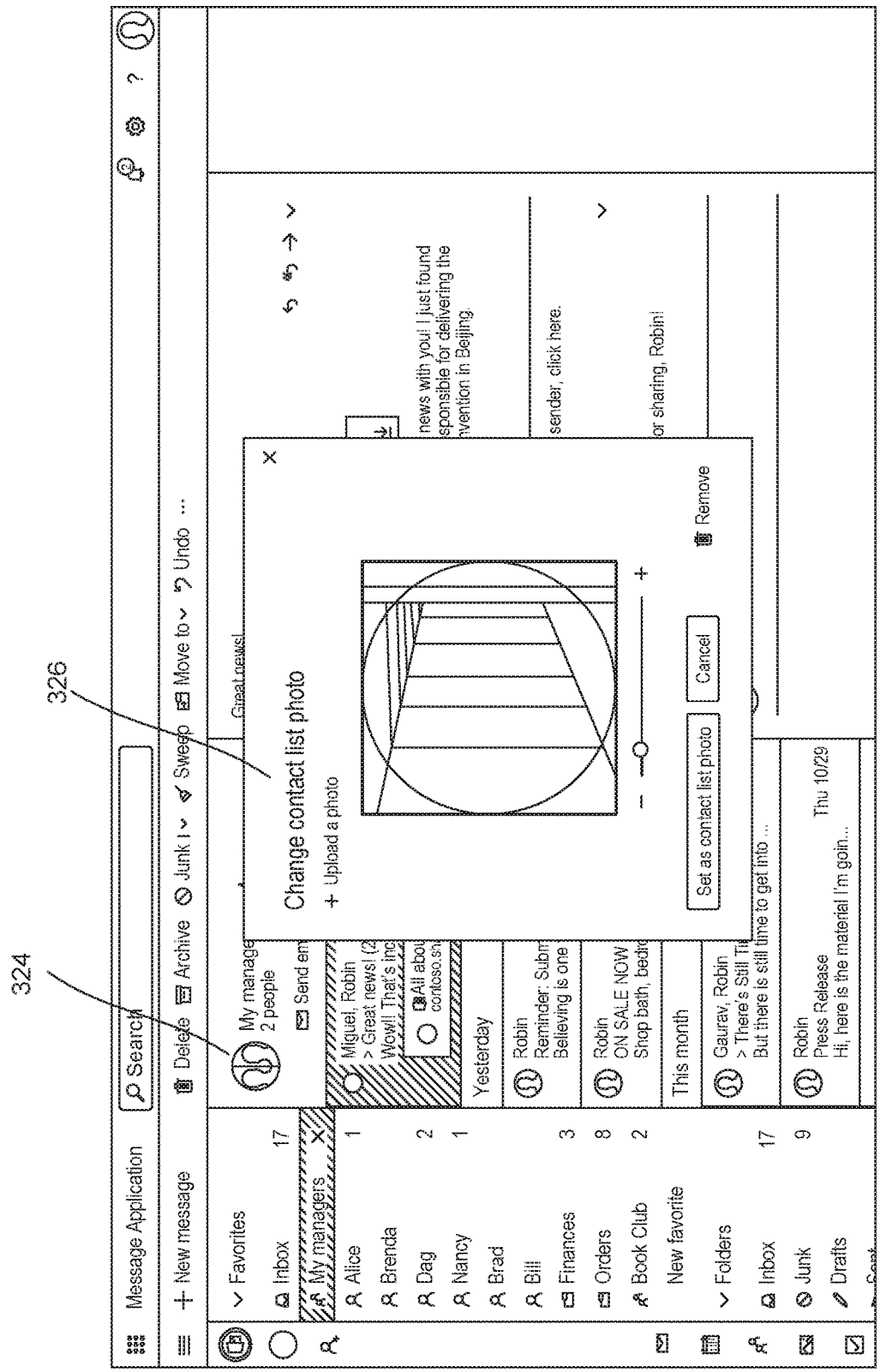
FIGS. 3A-3N provide example user interfaces in which implementations of the present technology can be employed.

Turning to FIG. 3C, a list of options or action items to use in association with a group folder can be presented. In one example, a user may right click on the group folder representation 314 to view a list of action items related to the selected group folder. As shown in menu 318, action items may include mark all as read, delete all, remove from favorites, move up the list, move down the list, rename, edit, split list, delete, and create group. Assume the user desires to rename the group created that was automatically named as a default name including the individuals corresponding with the group folder. In such a case, the user can select the rename action item 320. Upon inputting a new name for the group folder, the new name "My managers" 322 to represent the folder can be reflected in the navigation pane, as illustrated in FIG. 3D. The user can also select to modify a default contact list photo. As illustrated in FIG. 3E, a default photo may be included to represent the folder. In this example, the image 324 includes portraits of the individuals of the group. By selecting the image 324 (or providing another indication to modify the image representation of the folder), the user can select a new image via window 326.

Figure 3F:
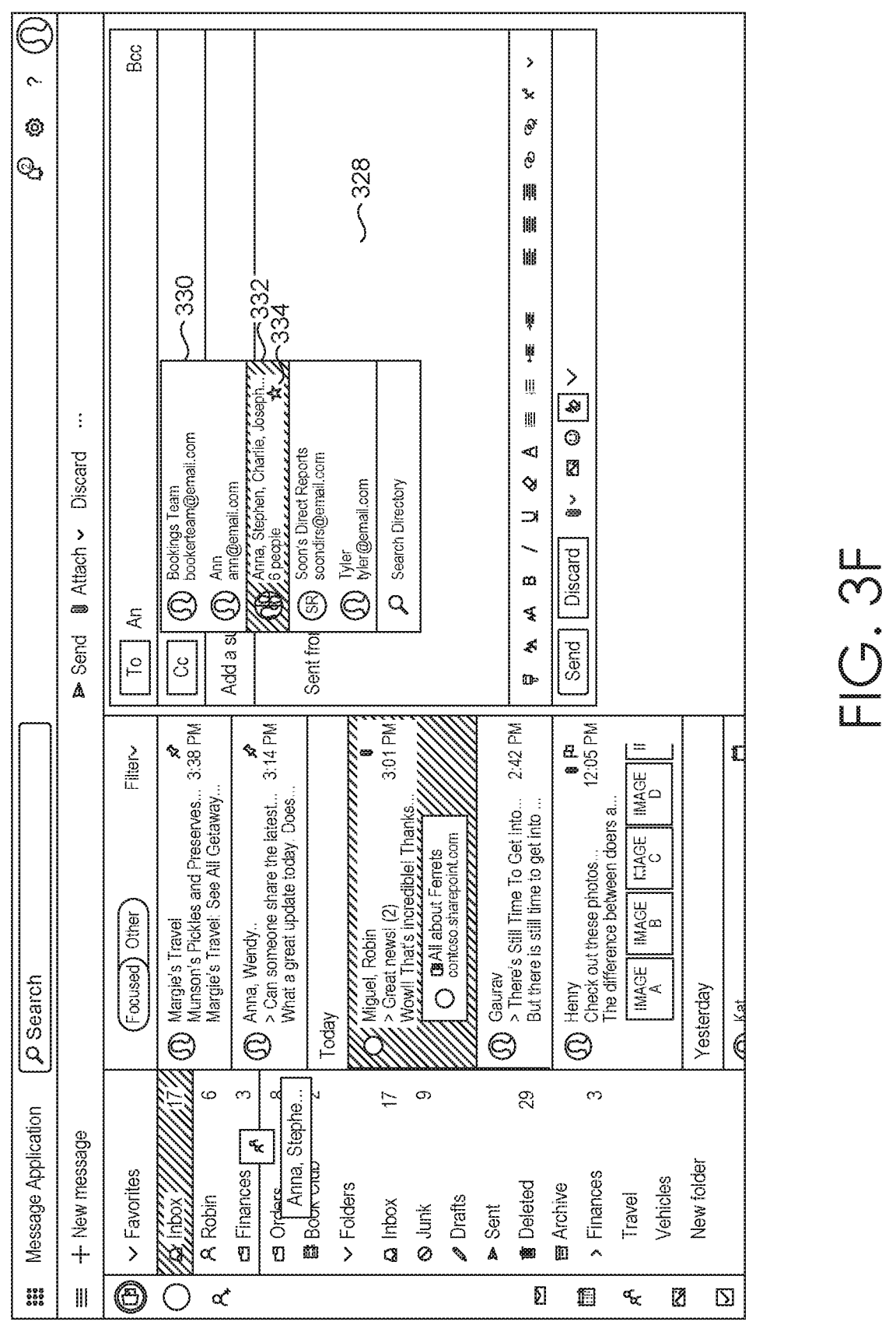

FIG. 3F provides another implementation option for initiating a group folder. In FIG. 3F, assume a user begins to compose a message 328. As shown, a list of suggestions 330 may be provided as candidate recipients. As a user shows interest in recipients including Anna, Stephen, Charlie, and Joseph 332 (e.g., via hovering over the candidate recipients), a favorites star 334 may be presented for the user as an option to add a group folder to the favorites listing in the navigation pane. If the user selects the favorites star 334, a group folder, including each of the individuals Anna, Stephen, Charlie, Joseph, et al., is created in the favorites listing.

Figure 3G:
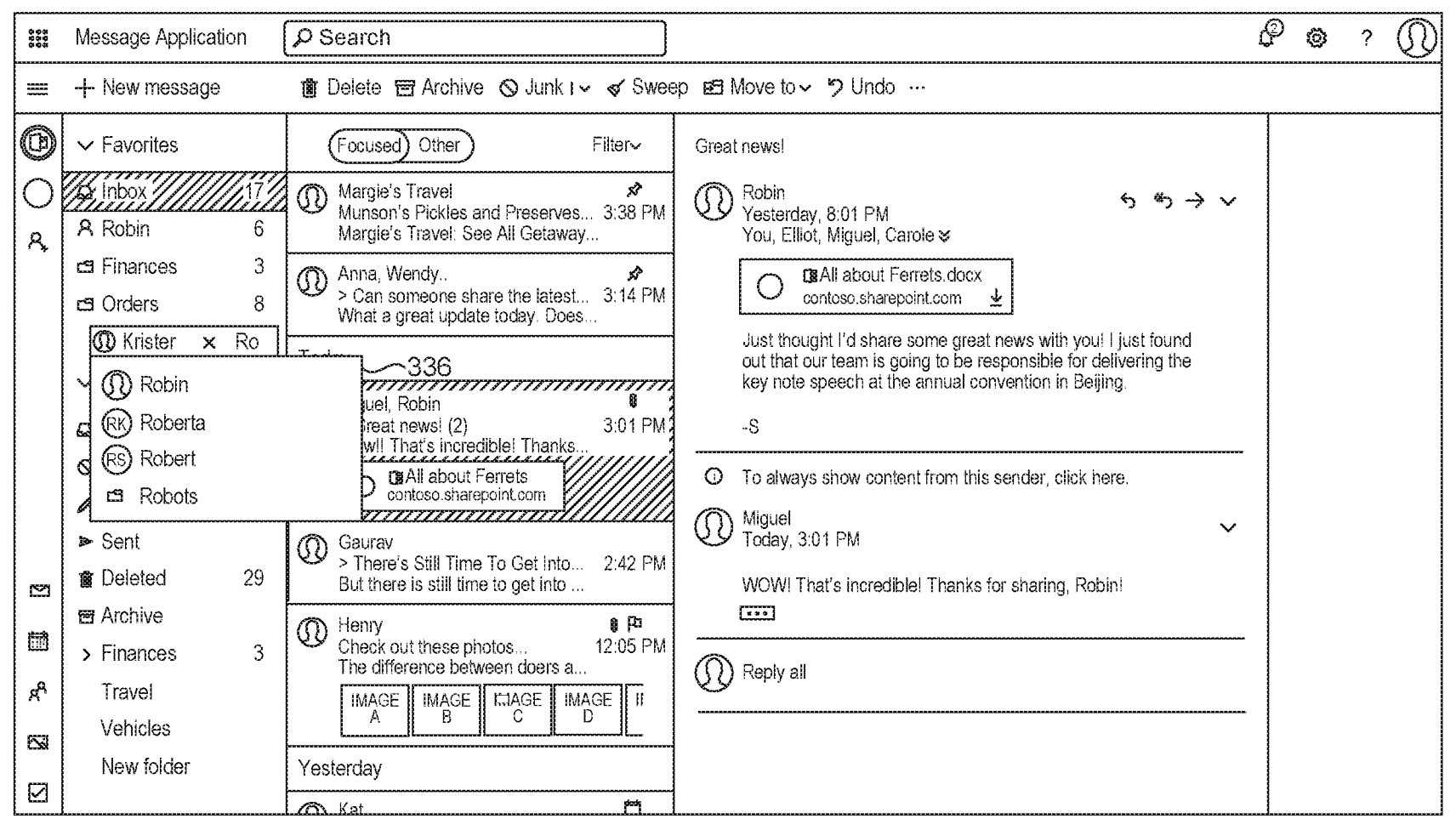

FIG. 3G provides another implementation option for initiating a group folder or adding to a group folder. In FIG. 3G, a drop-down list 336 can be provided. For example, a drop-down list can be presented upon a user selecting a previously generated folder, or a template folder. The drop-down list may include individuals or entities inferred to be relevant to the user or a group, an alphabetic listing of contacts, or the like. The user may select individuals or entities within the drop-down list to add individuals or entities to a group folder.

Figure 3H:
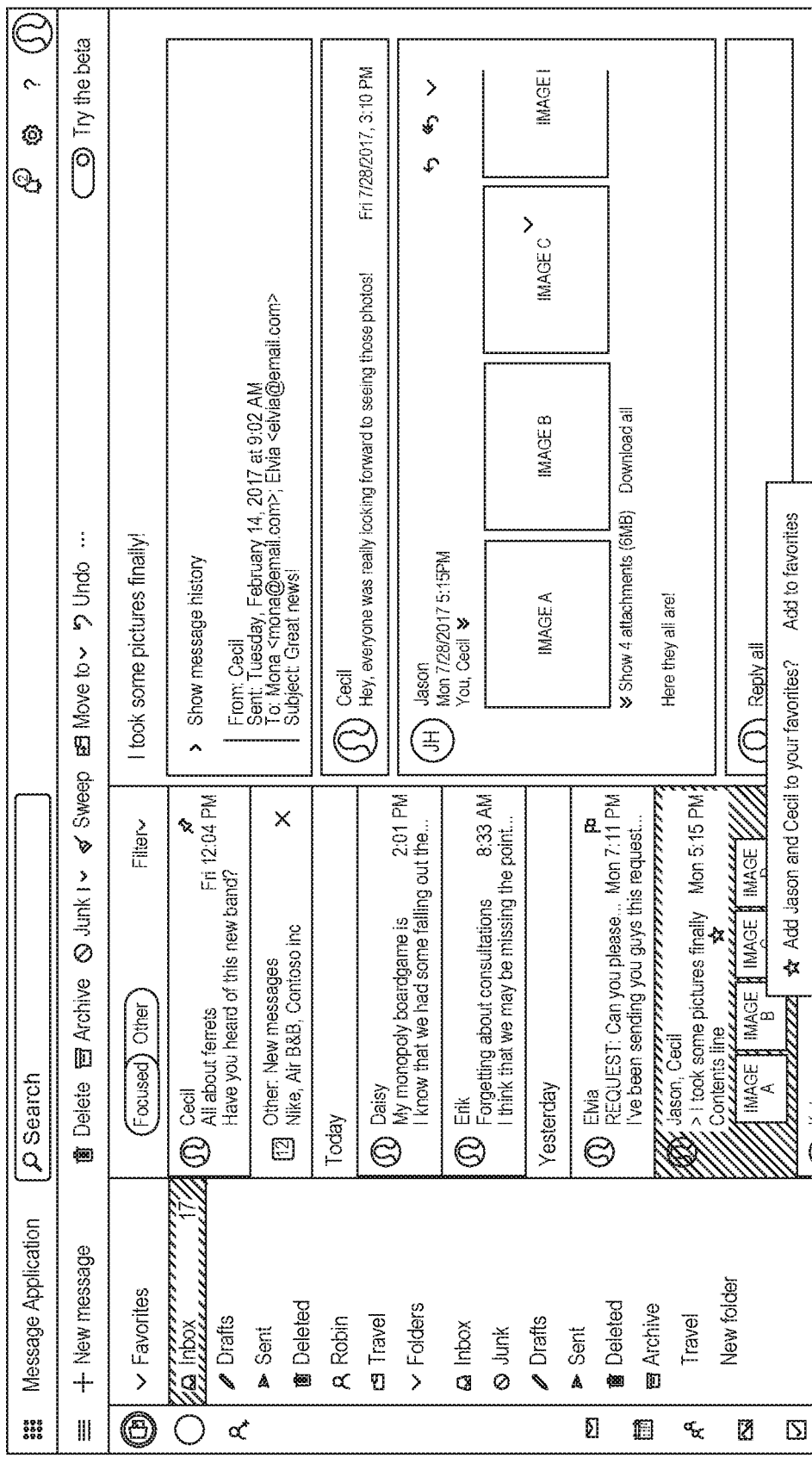

FIG. 3H provides yet another implementation option for initiating a group folder. In FIG. 3H, a popup or status bar prompt may be provided to suggest to add a group folder including specific individuals or entities. As shown in FIG. 3H, a prompt 338 may be presented to suggest adding Jason and Cecil as a group to a favorites listing. Such suggestions can be generated in any number of ways, such as, for example, based on sent messages, received messages, or the like.

Figure 3I:
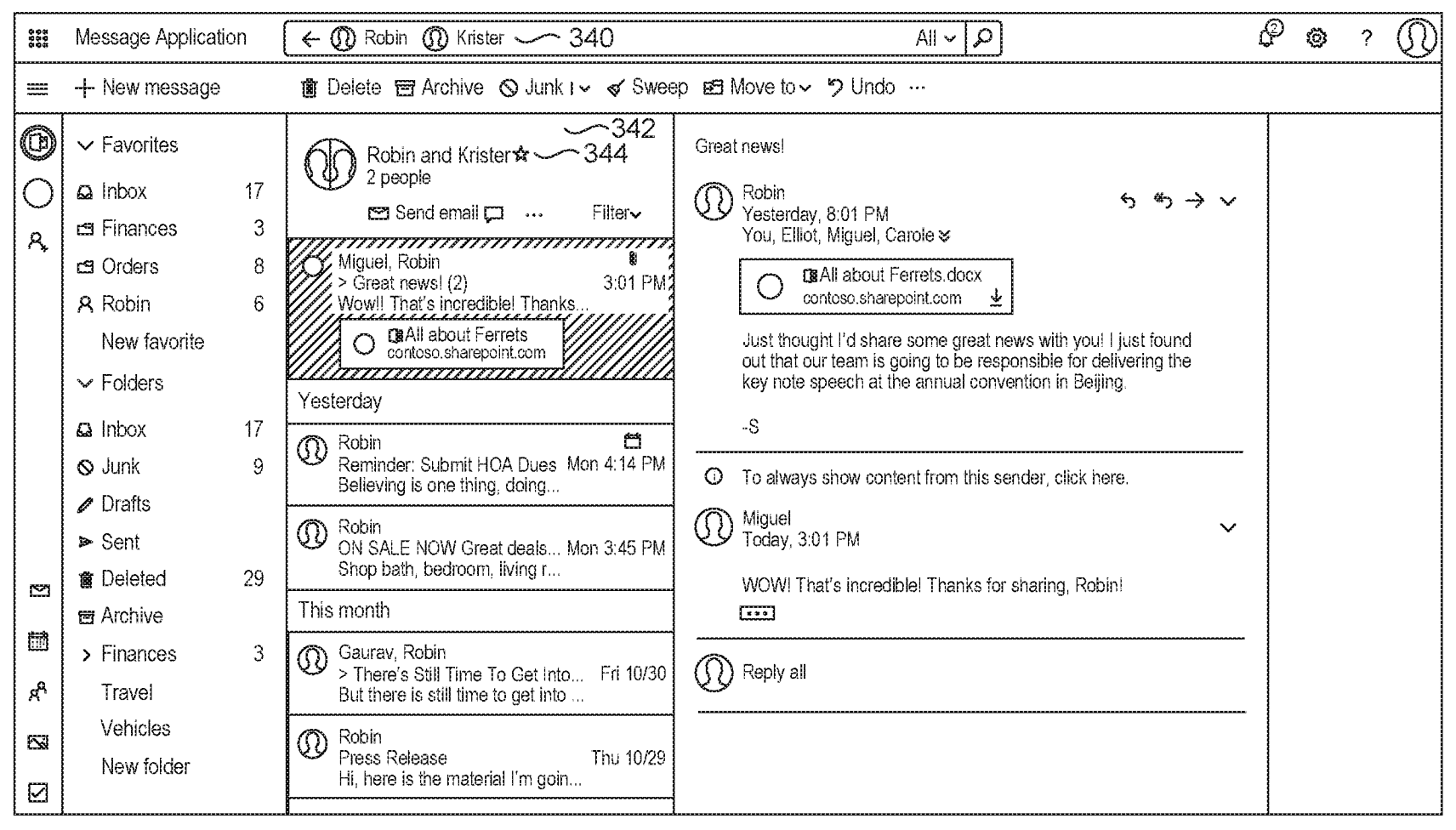
Figure 3J:
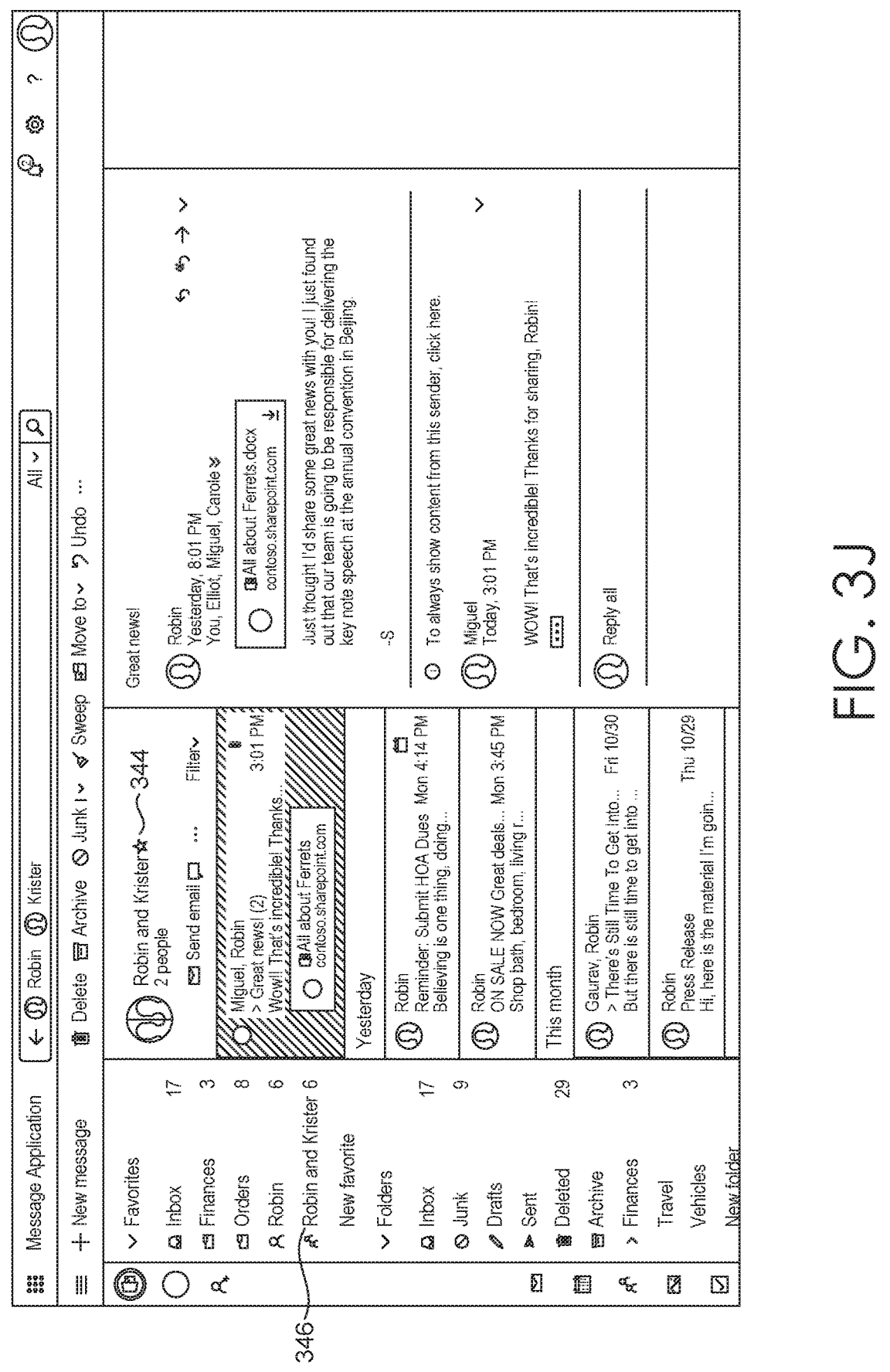

As another example for initiating a group folder, FIG. 3I illustrates such an operation via a search functionality. Assume a user utilizes search bar 340 of FIG. 3I to search for messages related to Robin and Krister. As shown in FIG. 3I, the message pane 342 includes messages from both Robin and Krister. A favorites star 344 is presented to enable a user to initiate a group folder corresponding with Robin and Krister. Turning to FIG. 3J, assume a user selects the favorites star 344, in such a case, a new group folder can be created and a group folder representation 346 presented in the navigation pane.

Figure 3K:
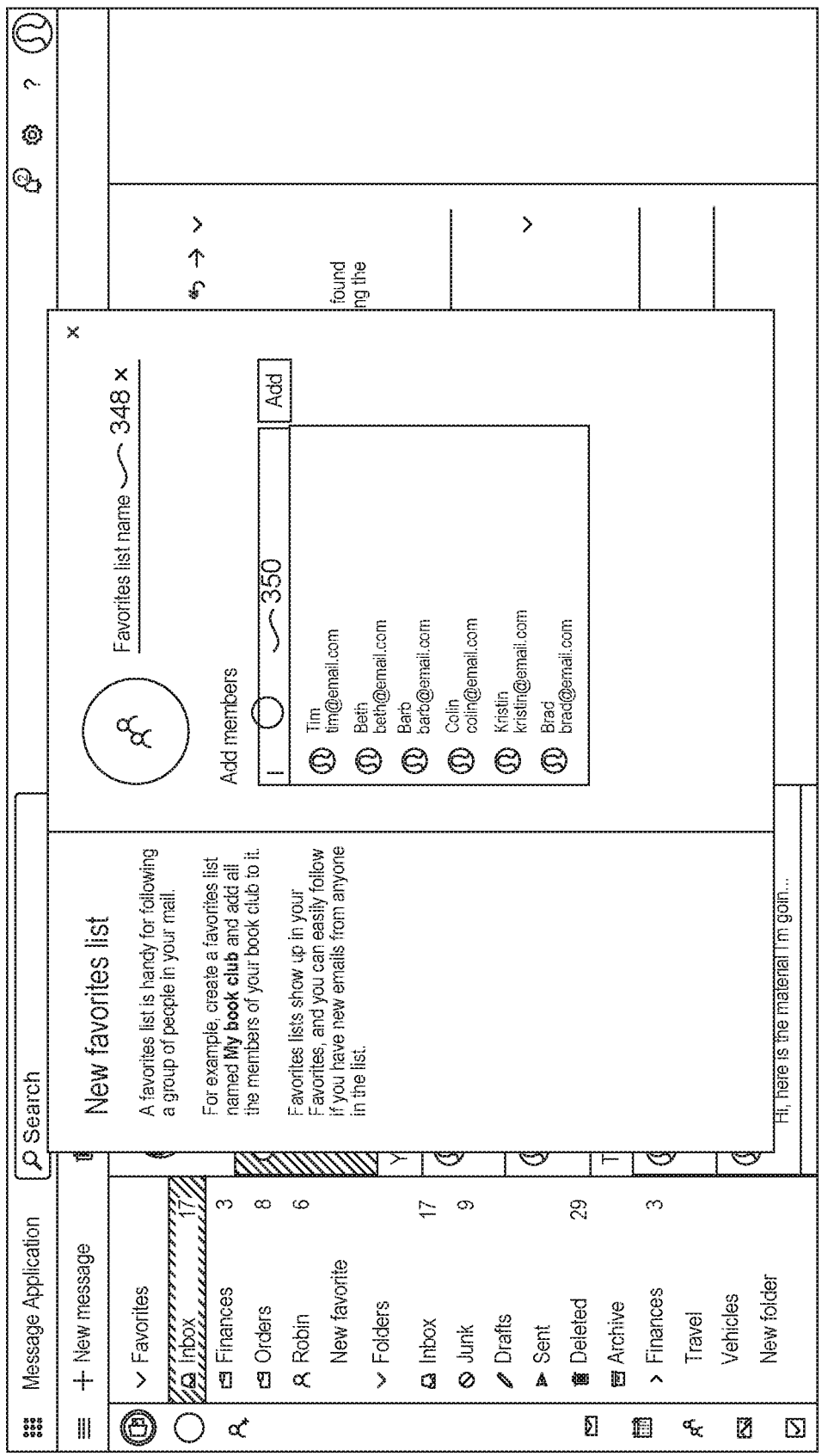

FIG. 3K provides another example for initiating a group folder. In FIG. 3K, a user may select to add a group folder. The user can provide a name 348 and a set of members 350 for a group folder. As can be appreciated, such an implementation may be used to initiate a new group folder or modify an existing group folder.

Figure 3L:
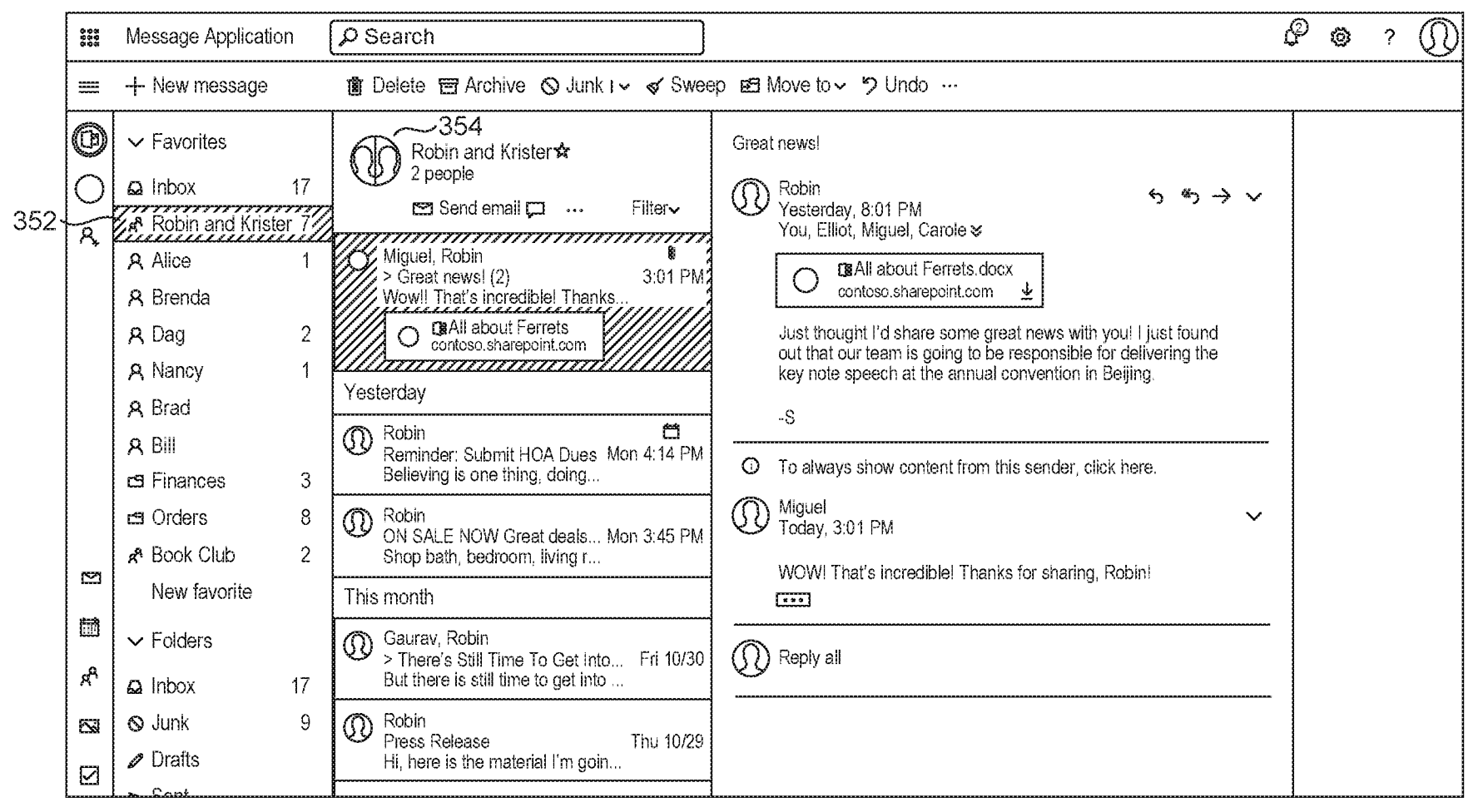

FIG. 3L provides one example of a default folder representation created specific to individuals associated with a group folder. In this example, two individuals Robin and Krister correspond with the group folder. As such, a default folder representation 352 may include the first names of the individuals. A default icon or image 354 may also be generated and presented. In this example, the default icon or image 354 includes portraits of the two individuals. As can be appreciated, the default icon or image may include the profile images associated with each of the individuals or entities of the group folder.

Figure 3M:
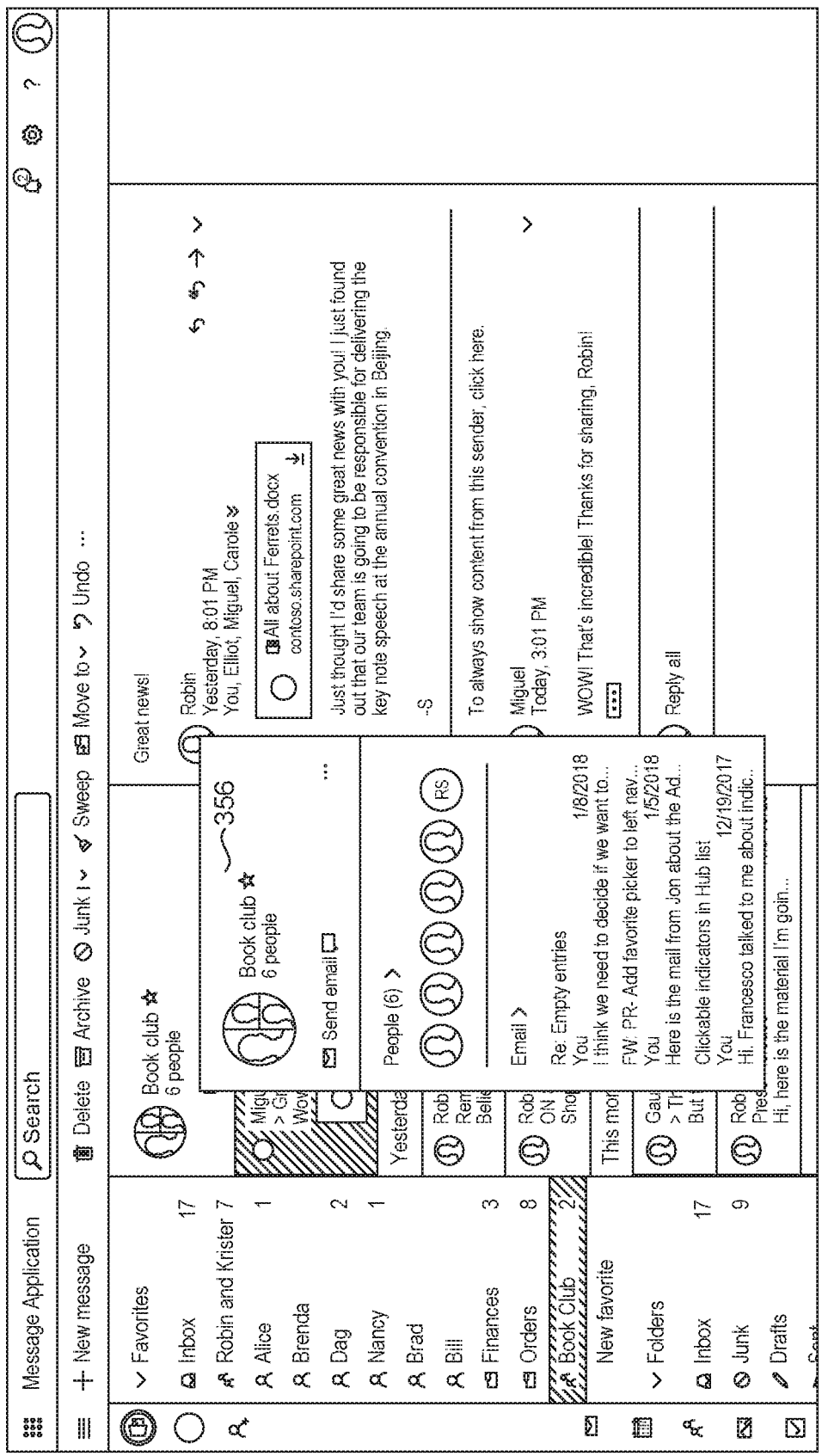
Figure 3N:
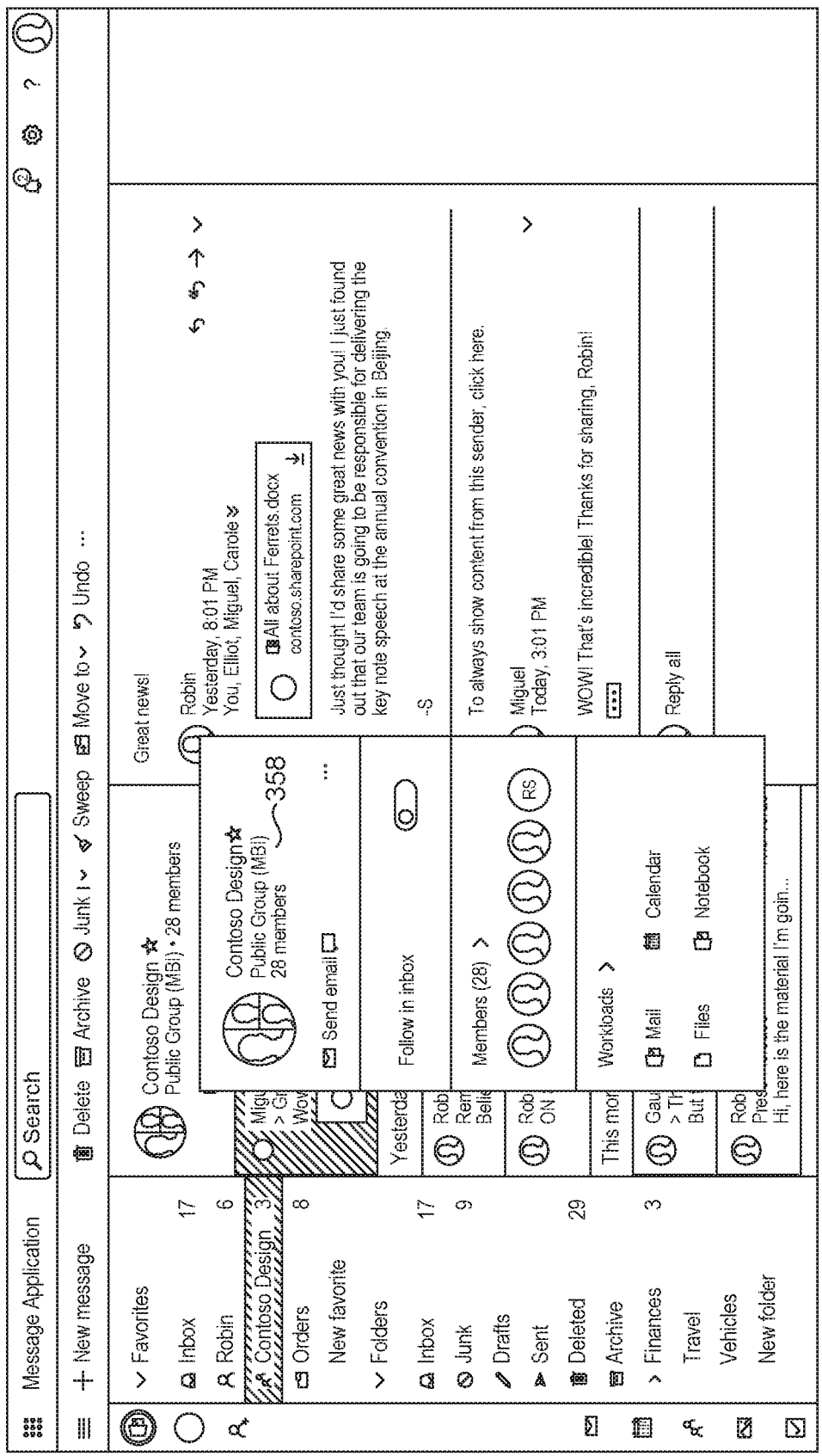

FIGS. 3M and 3N provide example cards used to describe a group. A user may select to view a card for a group. For example, with specific reference to FIG. 3M, assume a user desires to view a card related to the book club group. In such a case, card 356 may be presented. Card 356 can include an option to send a message, an option to start another messaging communication (e.g., instant message, video call), an indication or identification of the individuals or entities of the group, a set of recent emails associated with the group. FIG. 3N provides another example card 358 associated with a group folder.

Figure 4:
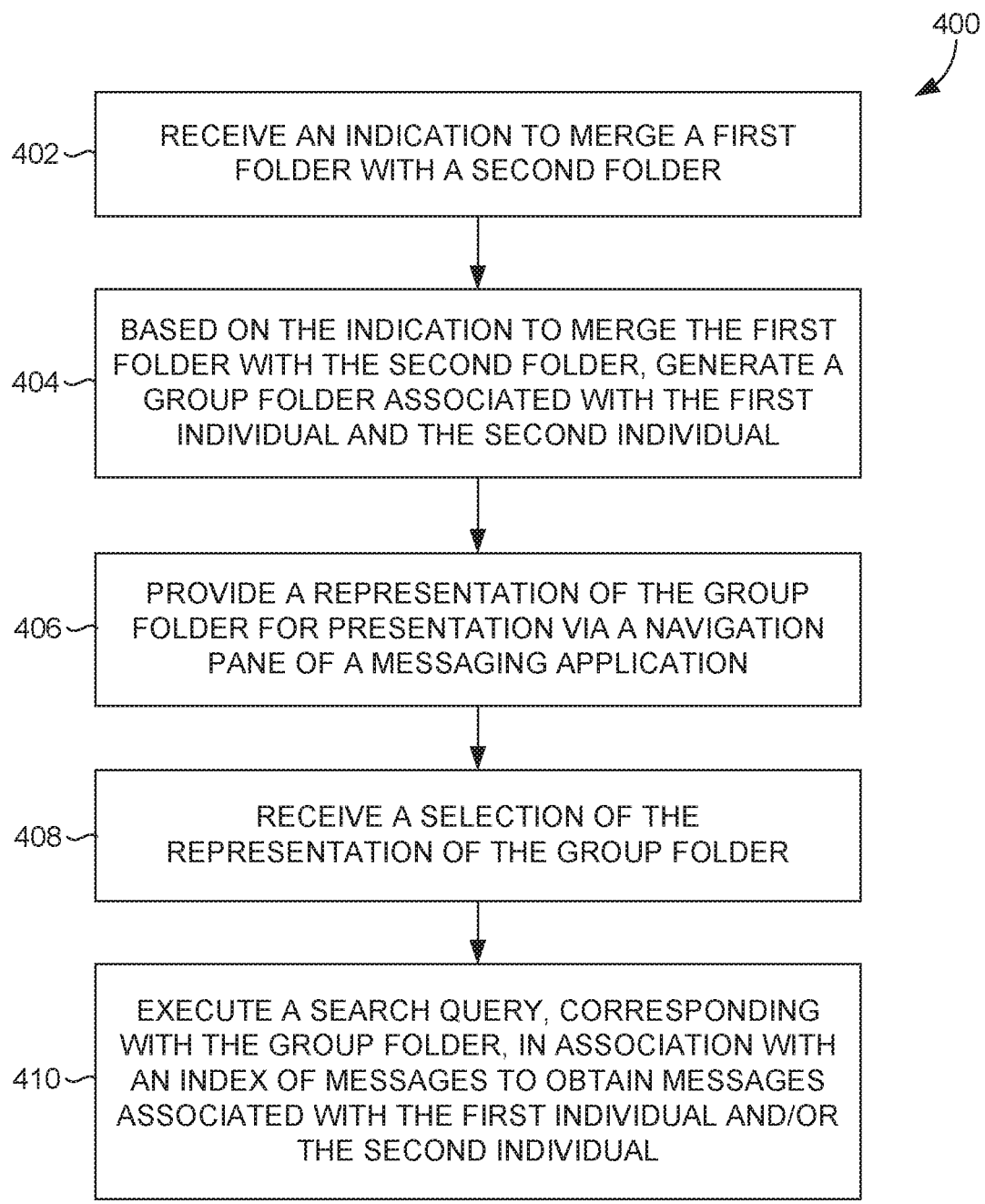
FIG. 4 provides a first example method for facilitating generation and utilization of group folders, in accordance with aspects of the technology described herein.
Figure 5:
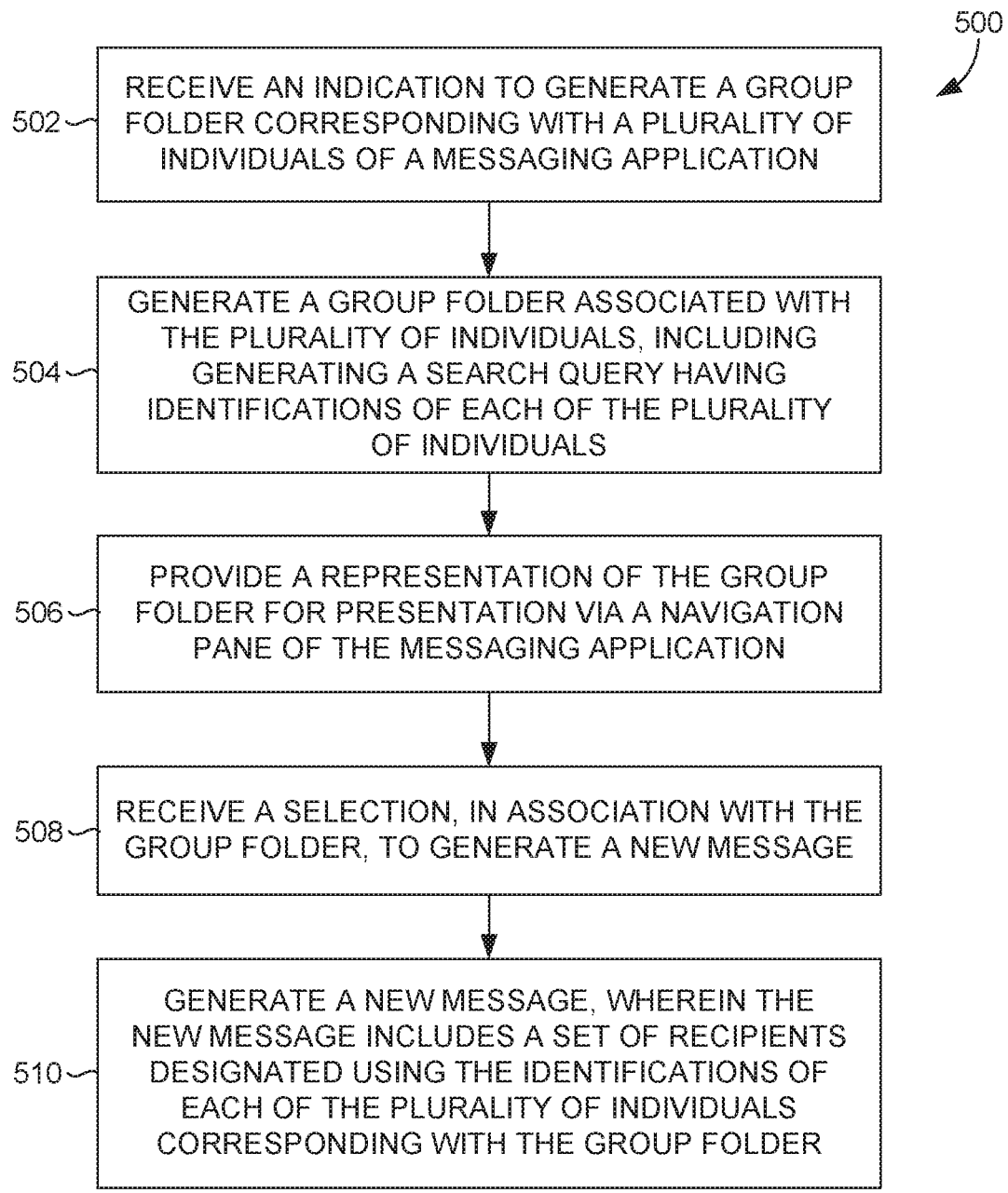
FIG. 5 provides a second example method for facilitating generation and utilization of group folders, in accordance with aspects of the technology described herein.
Figure 6:
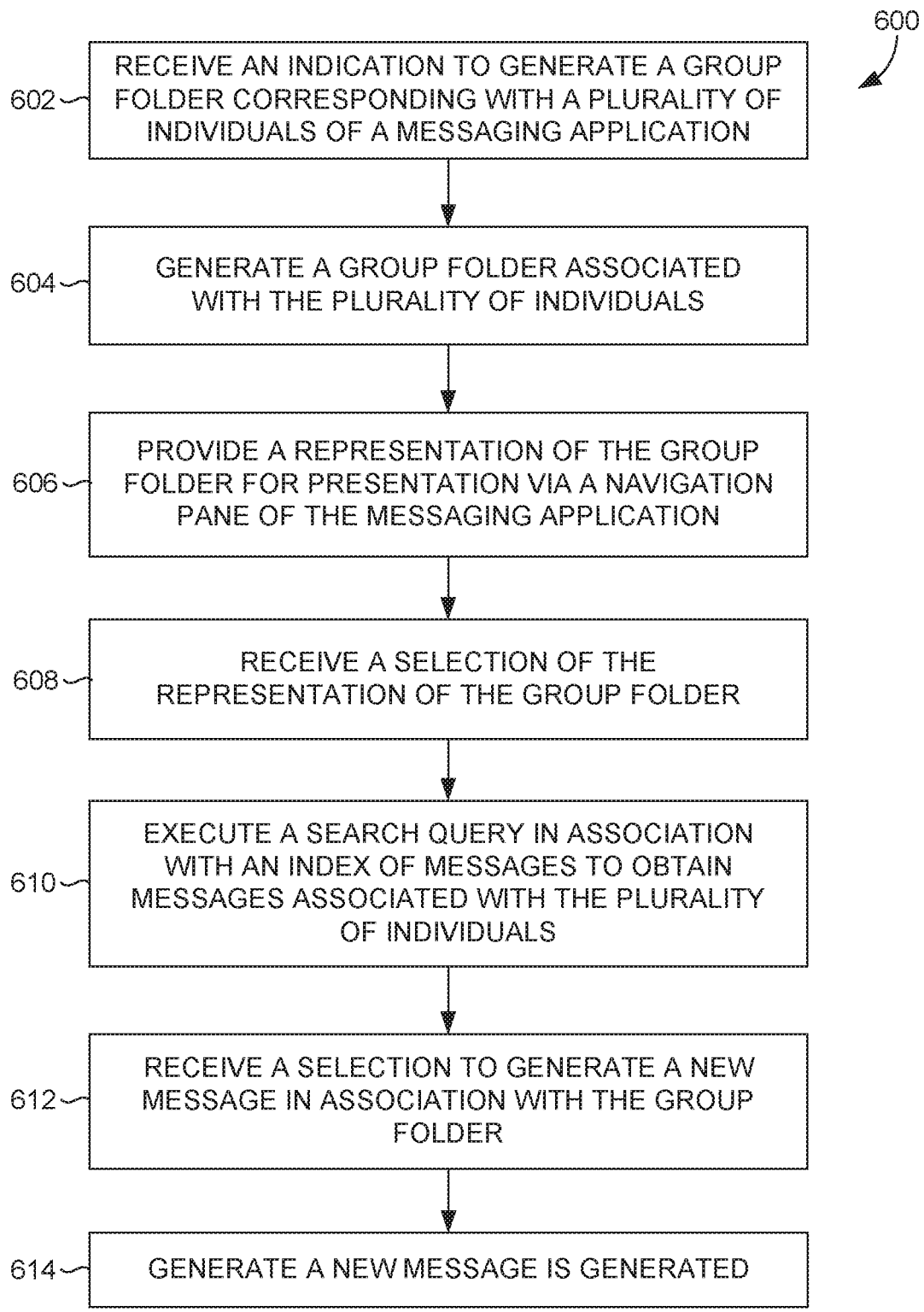
FIG. 6 provides a third example method for facilitating generation and utilization of group folders, in accordance with aspects of the technology described herein.

FIGS. 4-6 provide methods of facilitating message composition based on absent context, in accordance with embodiments described herein. The methods 400, 500, and 600 can be performed by a computer device, such as device 700 described below. The flow diagrams represented in FIGS. 4-6 are intended to be exemplary in nature and not limiting.

Turning initially to method 400 of FIG. 4, method 400 is directed to facilitating generation and utilization of group folders, in accordance with embodiments of the present invention. Initially, at block 402, an indication to merge a first folder with a second folder is received. In embodiments, the first folder is associated with a first entity of a messaging application, and the second folder associated with a second entity of the messaging application. At block 404, based on the indication to merge the first folder with the second folder, a group folder associated with the first entity and the second entity is generated. In embodiments, generating the group folder includes generating a search query including a first identification of the first entity and a second identification of the second entity. Thereafter, at block 406, a representation of the group folder is provided for presentation via a navigation pane of a messaging application. At block 408, a selection of the representation of the group folder is received. At block 410, a search query, corresponding with the group folder, is executed in association with an index of messages to obtain messages associated with the first entity and/or the second entity.

With reference to method 500 of FIG. 5, FIG. 5 is directed to facilitating generation and utilization of group folders, in accordance with embodiments of the present invention. Initially, at block 502, an indication to generate a group folder corresponding with a plurality of entities of a messaging application is received. At block 504, a group folder associated with the plurality of entities is generated, including generating a search query having identifications of each of the plurality of entities. At block 506, a representation of the group folder is provided for presentation via a navigation pane of the messaging application. At block 508, a selection, in association with the group folder, to generate a new message is received. Thereafter, at block 510, a new message is generated, wherein the new message includes a set of recipients designated using the identifications of each of the plurality of entities corresponding with the group folder.

Turning now to method 600 of FIG. 6, FIG. 6 is directed to facilitating generation and utilization of group folders, in accordance with embodiments of the present invention. Initially, at block 602, an indication to generate a group folder corresponding with a plurality of entities of a messaging application is received. At block 604, a group folder associated with the plurality of entities is generated. In embodiments, generating a group folder includes generating a search query having identifications of each of the plurality of entities. At block 606, a representation of the group folder is provided for presentation via a navigation pane of the messaging application. At block 608, a selection of the representation of the group folder is received. Thereafter, at block 610, a search query is executed in association with an index of messages to obtain messages associated with the plurality of entities. Returning to block 606, when a selection to generate a new message in association with the group folder is received at bock 612, a new message is generated at block 614. Such a new message includes a set of recipients designated using the identifications of each of the plurality of entities corresponding with the group folder.

Overview of Exemplary Operating Environment

Having briefly described an overview of aspects of the technology described herein, an exemplary operating environment in which aspects of the technology described herein may be implemented is described below in order to provide a general context for various aspects of the technology described herein.

Figure 7:
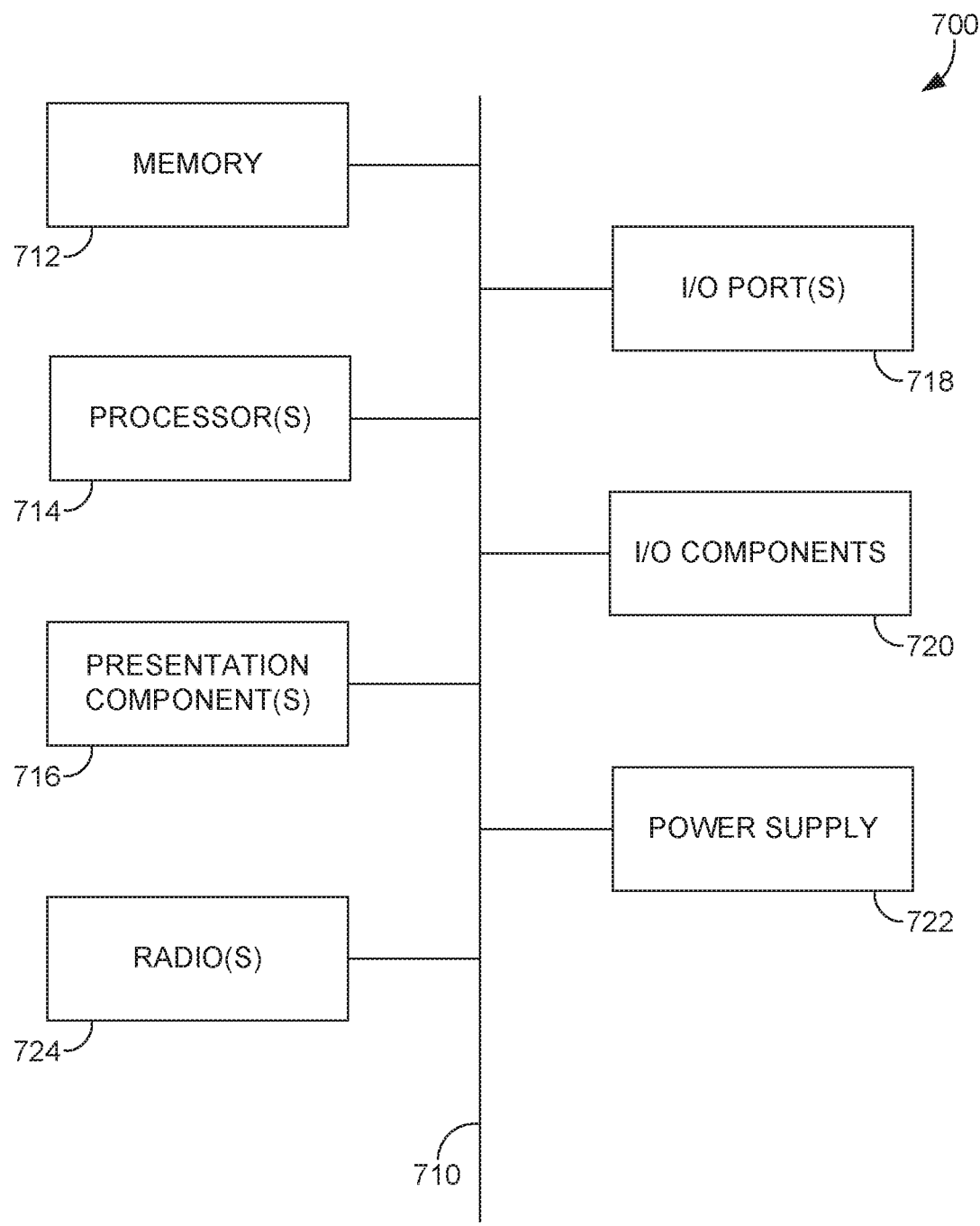
FIG. 7 is a block diagram of an exemplary computing environment suitable for use in implementing aspects of the technology described herein.

Referring to the drawings in general, and initially to FIG. 7 in particular, an exemplary operating environment for implementing aspects of the technology described herein is shown and designated generally as computing device 700. Computing device 700 is just one example of a suitable computing environment and is not intended to suggest any limitation as to the scope of use or functionality of the technology described herein. Neither should the computing device 700 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, and specialty computing devices. Aspects of the technology described herein may also be practiced in distributed computing environments where tasks are performed by remote-processing devices that are linked through a communications network.

With continued reference to FIG. 7, computing device 700 includes a bus 710 that directly or indirectly couples the following devices: memory 712, one or more processors 714, one or more presentation components 716, input/output (I/O) ports 718, I/O components 720, an illustrative power supply 722, and a radio(s) 724. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 7 is merely illustrative of an exemplary computing device that can be used in connection with one or more aspects of the technology described herein. Distinction is not made between such categories as "workstation," "server," "laptop," and "handheld device," as all are contemplated within the scope of FIG. 7 and refer to "computer" or "computing device."

Computing device 700 typically includes a variety of computer-readable media. Computer-readable media can be any available media that can be accessed by computing device 700 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 712 includes computer storage media in the form of volatile and/or nonvolatile memory. The memory 712 may be removable, non-removable, or a combination thereof. Exemplary memory includes solid-state memory, hard drives, and optical-disc drives. Computing device 700 includes one or more processors 714 that read data from various entities such as bus 710, memory 712, or I/O components 720. Presentation component(s) 716 present data indications to a user or other device. Exemplary presentation components 716 include a display device, speaker, printing component, and vibrating component. I/O port(s) 718 allow computing device 700 to be logically coupled to other devices including I/O components 720, some of which may be built in.

Illustrative I/O components include a microphone, joystick, game pad, satellite dish, scanner, printer, display device, wireless device, a controller (such as a keyboard, and a mouse), a natural user interface (NUI) (such as touch interaction, pen (or stylus) gesture, and gaze detection), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 714 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs may be interpreted as ink strokes for presentation in association with the computing device 700. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

A computing device may include radio(s) 724. The radio 724 transmits and receives radio communications. The computing device may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein has been described in relation to particular aspects, which are intended in all respects to be illustrative rather than restrictive.

What is claimed is:

1. A computing system comprising:
a processor; and
computer storage memory having computer-executable instructions stored thereon which, when executed by the processor, configure the computing system to:
receiving an indication to merge a first folder with a second folder, the first folder associated with a first entity of a messaging application and the second folder associated with a second entity of the messaging application;
based on the indication to merge the first folder with the second folder, generating a group folder associated with the first entity and the second entity, wherein generating the group folder comprises generating a search query including a first identification of the first entity and a second identification of the second entity; and
providing a representation of the group folder for presentation via a navigation pane of the messaging application, wherein a selection of the representation of the group folder causes execution of the search query in association with an index of messages to obtain messages associated with the first entity or the second entity.

2. The computing system of claim 1, wherein the indication to merge the first folder with the second folder comprises a drag and drop of a representation of the first folder to a representation of the second folder.

3. The computing system of claim 1, wherein the indication to merge the first folder with the second folder comprises a selection to merge the first folder with the second folder via a graphical user interface.

4. The computing system of claim 1, wherein the first folder and the second folder are presented within a favorites portion of the navigation pane of the messaging application.

5. The computing system of claim 1, wherein the representation of the group folder is presented within a favorites portion of the navigation pane of the messaging application.

6. The computing system of claim 1, wherein the obtained messages associated with the first entity or the second entity are aggregated in association with the group folder.

7. The computing system of claim 1, wherein the obtained messages associated with the first entity or the second entity include messages received from the first entity and the second entity.

8. The computing system of claim 1, wherein the index of messages includes a subindex corresponding with the group folder.

9. The computing system of claim 1 further comprising:
receiving a selection in association with the group folder to compose a message;
generating a new message with a pre-populated set of recipients, the pre-populated set of recipients comprising the first identification of the first entity and the second identification of the second entity.

10. A computer-implemented method for facilitating message composition, the method comprising:
receiving an indication to generate a group folder corresponding with a plurality of entities of a messaging application;
generating the group folder associated with the plurality of entities, wherein generating the group folder comprises generating a search query including identifications of each of the plurality of entities;
providing a representation of the group folder for presentation via a navigation pane of the messaging application;
receiving a selection, in association with the group folder, to generate a new message; and
generating the new message having a set of recipients designated using the identifications of each of the plurality of entities corresponding with the group folder.

11. The method of claim 10, wherein the messaging application comprises an electronic mail application.

12. The method of claim 10, wherein the group folder is generated only for a user providing the indication to generate the group folder.

13. The method of claim 10 further comprising:
receiving a selection to view messages associated with the group folder; and
executing the search query to obtain a set of messages received from the plurality of entities corresponding with the group folder.

14. The method of claim 13, wherein the search query is executed via an index of all messages associated with a user providing the indication to generate a group folder.

15. The method of claim 10, wherein the indication to generate the folder group comprises a selection to merge multiple folders associated with the plurality of entities.

16. One or more computer storage media having computer-executable instructions embodied thereon that, when executed by one or more processors, cause the one or more processors to perform a method, the method comprising:
receiving an indication to generate a group folder corresponding with a plurality of entities of a messaging application;
generating the group folder associated with the plurality of entities, wherein generating the group folder comprises generating a search query including identifications of each of the plurality of entities; and
providing a representation of the group folder for presentation via a navigation pane of the messaging application, wherein
a selection of the representation of the group folder causes execution of the search query in association with an index of messages to obtain messages associated with the plurality of entities, and
a selection, in association with the group folder, to generate a new message causes generation of the new message having a set of recipients designated using the identifications of each of the plurality of entities corresponding with the group folder.

17. The media of claim 16, wherein the representation of the group folder is presented within a favorites listing of the navigation pane.

18. The media of claim 16, wherein the indication to generate the group folder comprises a selection to merge a first folder associated with a first portion of the plurality of entities and a second folder associated with a second portion of the plurality of entities.

19. The media of claim 18, wherein the selection to merge comprises dragging and dropping the first folder in proximity to the second folder.

20. The media of claim 16 further comprising:
receiving a selection of a group transfer action; and
generating a group in a different messaging application, the group in the different messaging application comprising the plurality of entities.

* * * * *